United States Patent
Billsberry

(10) Patent No.: US 12,392,904 B2
(45) Date of Patent: Aug. 19, 2025

(54) CONTROLLED RADIATION PATTERN ANTENNA FOR JAMMING/SPOOFING RESISTANT AIRBORNE GNSS SENSORS

(71) Applicant: Rockwell Collins, Inc., Cedar Rapids, IA (US)

(72) Inventor: Mark A. Billsberry, Indialantic, FL (US)

(73) Assignee: Rockwell Collins, Inc., Cedar Rapids, IA (US)

(*) Notice: Subject to any disclaimer, the term of this patent is extended or adjusted under 35 U.S.C. 154(b) by 411 days.

(21) Appl. No.: 18/097,425

(22) Filed: Jan. 16, 2023

(65) Prior Publication Data

US 2024/0241267 A1    Jul. 18, 2024

(51) Int. Cl.
*G01S 19/24*    (2010.01)
*G01S 19/43*    (2010.01)

(52) U.S. Cl.
CPC ............ *G01S 19/243* (2013.01); *G01S 19/43* (2013.01)

(58) Field of Classification Search
CPC ........ G01S 19/243; G01S 19/43; G01S 19/36; H01Q 3/2611; H01Q 1/28; H01Q 9/0414; H01Q 9/36; H01Q 1/1214; H01Q 9/0428
USPC ......................................................... 370/350
See application file for complete search history.

(56) References Cited

U.S. PATENT DOCUMENTS

| | | |
|---|---|---|
| 5,583,774 A | 12/1996 | Diesel |
| 5,712,641 A | 1/1998 | Casabona et al. |
| 6,697,019 B1 | 2/2004 | Hyuk-Joon et al. |
| 9,379,453 B2 | 6/2016 | Rentz |
| 9,825,373 B1 * | 11/2017 | Smith ................ H01Q 21/0006 |
| 10,283,876 B1 * | 5/2019 | Livadaru .............. H01Q 21/245 |
| 10,481,273 B1 | 11/2019 | Ulmer |
| 10,690,776 B2 * | 6/2020 | McMilin .................. H04K 3/28 |
| 10,770,794 B2 * | 9/2020 | Bartone ................. H01Q 9/045 |
| 11,194,052 B1 | 12/2021 | Kazmierczak et al. |

(Continued)

FOREIGN PATENT DOCUMENTS

| | | | | |
|---|---|---|---|---|
| CN | 108873929 A | * | 11/2018 | ............. G05D 1/101 |
| WO | WO-2016085554 A2 | * | 6/2016 | ............. G01S 19/21 |

(Continued)

OTHER PUBLICATIONS

Navid Rezazadeh, A Compact Antenna for GPS Ani-Jamming in Airborne applications (Year: 2019), Oct. 22, 2019, All page and figures.*

(Continued)

*Primary Examiner* — Mahendra R Patel
(74) *Attorney, Agent, or Firm* — Suiter Swantz IP

(57) ABSTRACT

A GNSS active antenna with improved performance in the presence of interfering signals is described. The GNSS active antenna meets the requirements of DO-301 for Airborne GNSS antennas when in normal operation. The GNSS active antenna also generates a low elevation null steered to any azimuth angle when in an environment with an interfering signal. The null has minimal performance impacts at higher elevation angles near zenith. The GNSS active antenna includes a right-hand circular polarized microstrip antenna with a concentric vertically polarized monopole antenna. The GNSS active antenna also meets the requirements of ARINC 743 antenna outline and mounting hole pattern.

15 Claims, 16 Drawing Sheets

(56) References Cited

U.S. PATENT DOCUMENTS

| | | | |
|---|---|---|---|
| 2005/0168375 A1* | 8/2005 | Halladay | G01S 7/38 |
| | | | 342/14 |
| 2008/0266181 A1 | 10/2008 | Ying | |
| 2010/0007555 A1* | 1/2010 | Ezal | H01Q 25/00 |
| | | | 342/417 |
| 2015/0346345 A1 | 12/2015 | Bartone | |
| 2016/0070001 A1* | 3/2016 | Krantz | H01Q 1/3275 |
| | | | 342/357.72 |
| 2017/0093041 A1* | 3/2017 | McMichael | H01Q 9/0464 |
| 2017/0093042 A1* | 3/2017 | McMichael | H01Q 9/0428 |
| 2020/0274634 A1* | 8/2020 | Schay | H04K 3/90 |
| 2020/0343638 A1* | 10/2020 | Schay | H01Q 5/307 |
| 2020/0371245 A1 | 11/2020 | Murphy et al. | |
| 2022/0050213 A1* | 2/2022 | De Wilde | G01S 19/36 |
| 2022/0247082 A1* | 8/2022 | Parsche | H01Q 5/40 |
| 2022/0344823 A1* | 10/2022 | Panther | H01Q 21/26 |

FOREIGN PATENT DOCUMENTS

| | | | | |
|---|---|---|---|---|
| WO | WO-2018119153 A2 * | 6/2018 | | H01Q 9/0414 |
| WO | WO-2021195772 A1 * | 10/2021 | | G08G 5/80 |

OTHER PUBLICATIONS

European Patent Office, Extended European Search Report received in EP Application No. 24152087.3, Jul. 5, 2024, 12 pages.

Rezazadeh et al., "A Compact Antenna for GPS Anti-Jamming in Airborne Applications," IEEE Access, vol. 7, Oct. 22, 2019, 7 pages.

* cited by examiner

900

902
SCAN A NULL IN AZIMUTH AND MEASURE SIGNAL LEVEL WITH MONOPOLE ANTENNA DISCONNECTED FROM OUTPUT

904
DETECT SIGNAL LEVEL DROP OFF AT ANGLE IN AZIMUTH FROM INTERFERING SIGNAL WITH MONOPOLE DISCONNECTED FROM OUTPUT

906
DIRECT NULL AT THE ANGLE IN AZIMUTH TO NULL THE INTERFERING SIGNAL

FIG. 9

CONTROLLED RADIATION PATTERN ANTENNA FOR JAMMING/SPOOFING RESISTANT AIRBORNE GNSS SENSORS

TECHNICAL FIELD

The present invention generally relates to navigation systems, and more specifically to reducing interference of the navigation systems.

BACKGROUND

Global navigational satellite systems (GNSS) refer to a variety of satellite navigation systems used for providing autonomous geo-spatial positioning. These satellite navigation systems include, for example, the global positioning system (GPS), the Russian global orbiting navigational satellite system (GLONASS), the European satellite navigation system Galileo, the Chinese satellite navigation systems BeiDou, and other global or regional systems. Each satellite navigation system can include a constellation of satellites deployed in orbits around the earth that continuously transmit positioning signals. The constellation of satellites can transmit radio frequency (RF) positioning signals over various frequency bands. For example, GPS satellites can transmit L1-band positioning signals having a center frequency of 1575.42 MHz, L2-band positioning signals with a center frequency of 1227.6 MHz, and L5-band positioning signals with a center frequency of 1176.45 MHz. Distinct frequency bands may be associated with different types of navigation applications, e.g., civil or military navigation.

Generally, GNSS signals are low power and are prone to interference caused from a variety of sources, for example, such as radio emissions, intentional or unintentional jamming, naturally occurring conditions (e.g., space weather, magnetized materials, or the like), government testing, spoofing, or the like. Interference on the GNSS signals can cause difficulties and/or inaccuracies for a GNSS/GPS receiver in determining location information or other navigation data from the GNSS signals. On the other hand, spoofing causes difficulties and/or inaccuracies by masquerading as a GNSS signal, but with false or incorrect navigation data which can cause a GNSS/GPS receiver to calculate false or incorrect location (or position) information.

GNSS jamming and spoofing, whether unintentional or intentional, is becoming more common. GNSS sensors must achieve a given level of performance in the presence of various spoofer signals for robustness and/or to meet current and future GNSS community standards. Therefore, it would be advantageous to provide a device, system, and method that cures the shortcomings described above.

SUMMARY

A GNSS active antenna is described, in accordance with one or more embodiments of the present disclosure. In some embodiments, the GNSS active antenna includes a microstrip antenna comprising a patch disposed on a dielectric substrate. In some embodiments, the microstrip antenna is right-hand circular polarized. In some embodiments, the microstrip antenna is configured to receive a GNSS signal. In some embodiments, the GNSS active antenna includes a monopole antenna. In some embodiments, the monopole antenna is disposed in the hole and concentric with the patch. In some embodiments, the monopole antenna is vertical polarized. In some embodiments, the GNSS active antenna includes an active sub-assembly coupled to the microstrip antenna and the monopole antenna. In some embodiments, the active sub-assembly is configured to generate a controlled radiation pattern comprising a null by combining an output from the microstrip antenna and an output from the monopole antenna. In some embodiments, the active sub-assembly is configured to steer the null in azimuth.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 9 depicts a flow diagram of a method, in accordance with one or more embodiments of the present disclosure.

DETAILED DESCRIPTION OF THE INVENTION

Figure 1:
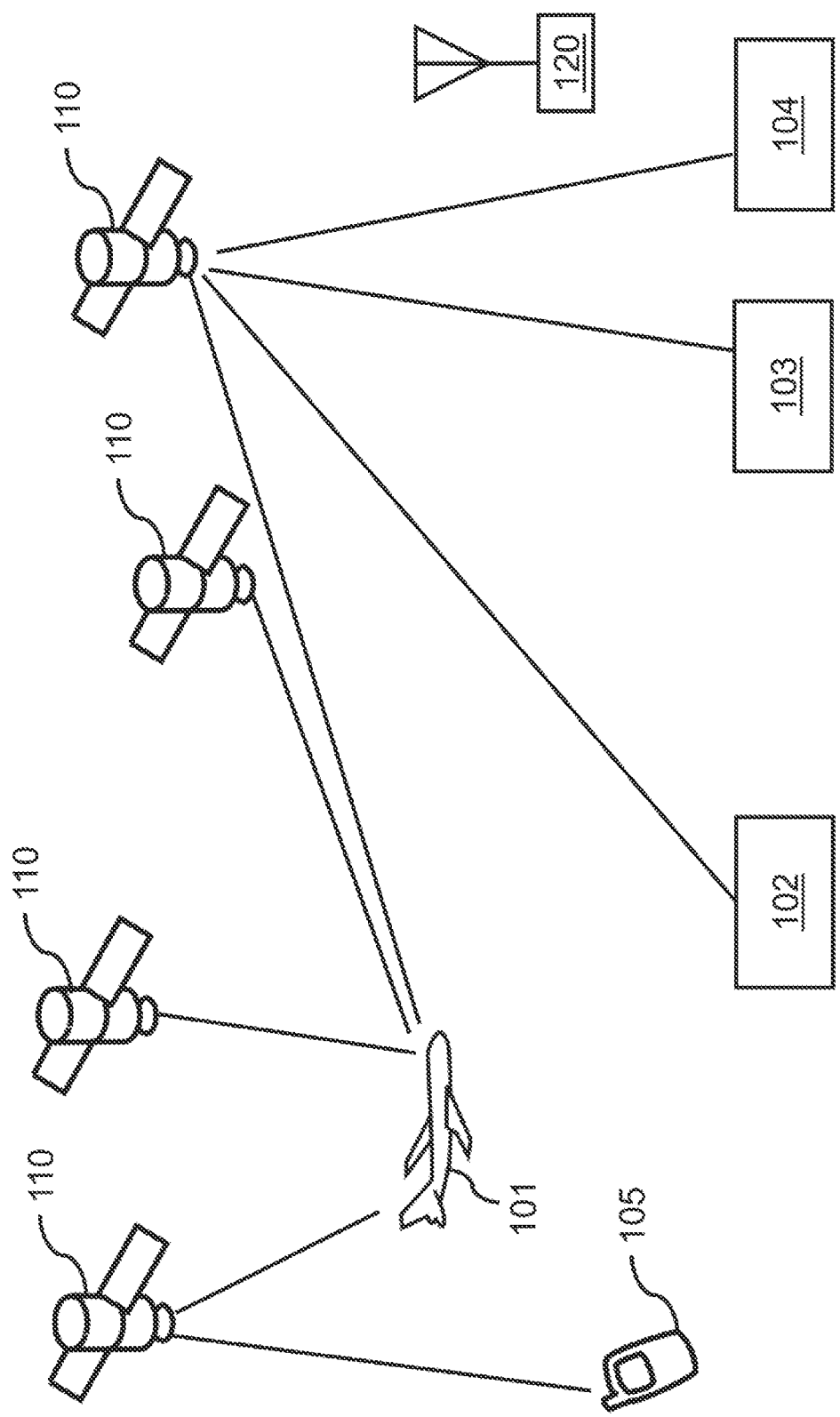
FIG. 1 depicts a diagram of a satellite navigation network or Global Navigation Satellite System (GNSS) including one or more interference sources, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally now to one or more embodiments of the present disclosure. Embodiments of the present disclosure are directed to systems and methods for real-time GNSS interference and/or spoofing monitoring. A GNSS active antenna may perform the real-time GNSS interference and/or spoofing monitoring. The GNSS active antenna includes a right-hand circular polarized microstrip patch antenna with a concentric monopole antenna. The monopole may be disconnected and connected to an output path. The GNSS active antenna may be compliant with minimum operational performance standards (MOPS) when the monopole is disconnected to the output path. The GNSS active antenna may steer a null at a low elevation angle in azimuth when the monopole is connected to the output path. The ability to steer the null at the low elevation angle in azimuth may enable the GNSS active antenna to detect signals arriving at the low elevation angle. The signals at the low elevation angle may originate from an interferer or a spoofer. Once detected, the GNSS active antenna may steer the null towards the signal at the low elevation angle to reduce the signal strength from the interferer or spoofer. In this regard, the GNSS active antenna may be considered anti-jam or anti-spoof.

U.S. Pat. No. 11,194,052, titled "Systems and methods for real-time GNSS interference monitoring", filed on Aug. 30, 2018; and U.S. Pat. No. 10,481,273, titled "Systems and methods for GNSS processing during interference suppression", filed on Nov. 6, 2017; are each incorporated herein by reference in the entirety.

Referring now to FIG. 1, a satellite navigation network 100 is shown according to an exemplary embodiment of the inventive concepts disclosed herein. The satellite navigation network 100 includes various platforms including an airborne platform 101, a ground-based (e.g., stationary) platform 102, a mobile ground platform 103, a maritime platform 104, and/or a portable electronic device 105 (e.g., handheld device). It will be appreciated that various other navigation devices may be included in the satellite navigation network 100 so as to navigate with the one or more satellites 110. The various platforms can be configured to transmit/receive (e.g., via one or more receiver/transmitter/transceiver hardware devices) radio frequency signals to/from various remote sources. The platforms can receive incoming signals (e.g., radio frequency signals) from one or more satellites 110 along various lines of sight. The radio frequency signals may include, but are not limited to, GNSS signals (e.g., GPS signals).

In accordance with GNSS protocols, each satellite 110 may transmit or broadcast a signal (e.g., radio frequency signals such as GNSS/GPS signals). The signal may have a carrier frequency, a wavelength, an encoding, and a modulation, among other characteristics as specified by the GNSS protocol. The carrier frequencies may be a multiple of a fundamental frequency set by the GNSS protocol. In some embodiments, the fundamental frequency may be 10.23 MHz. The messages encoded in the signal may include a status message and ephemeris data. The ephemeris data may indicate a position of the satellite 110 in orbit around the Earth. In some embodiments, the signal transmitted by the satellite 110 may be a GPS signal, such as, but not limited to, a L1 C/A signal, a L2C signal, a L5 signal, and/or a L1C signal. In some embodiments, the signal may be a GPS L1 signal, and may have a carrier frequency of 1575.42 MHz (10.23 MHz×154) and a wavelength of 19.0 cm. In some embodiments, the signal transmitted by the satellite 110 may be a GPS L2 signal, and may have a carrier frequency of 1227.60 MHz (10.23 MHz×120) and a wavelength of 24.4 cm. In some embodiments, the signal transmitted by the satellite 110 may be, for example, a GPS L5 signal having a carrier frequency of 1176.45 MHz (10.23 MHz×115) and a wavelength of 25.48 cm. However, in other embodiments, the signal may be any suitable GNSS/GPS signal transmitted or otherwise broadcast by the satellite 110. For example, the signal may be a signal from the Global Navigation Satellite System (GLONASS), a signal from the BeiDou Navigation Satellite System, a signal from the Galileo Satellite System, and the like.

The satellite navigation network 100 may also include one or more interference sources 120. The interference sources 120 can emit radio frequency signals that interfere with, jam, and/or spoof GNSS receivers. In various embodiments, the interference sources 120 can be naturally occurring (e.g., weather, space weather, naturally magnetized materials, and/or the like) or can be devices that interfere (intentionally or unintentionally) with radio frequency signals (e.g., cell phone towers, radio masts/towers, signal jammers, signal spoofers, signal blockers, and/or the like). The interference sources 120 may jam, block, spoof, or otherwise interfere with the reception of GNSS signals from satellites 110. For example, the interference sources 120 may emit radio frequency signals that cause matched spectrum, multiple narrow bands, partial bands, swept jamming interference, and/or the like. In another example, the interference sources 120 may emit radio frequency signals that spoof GNSS signals by masquerading as the GNSS signals. In this case, the spoofed GNSS signals may not be recognized as signal interference per se, but may instead be falsely recognized as a GNSS signal that includes inaccurate navigation data or positioning information. The radio frequency signals emitted by the interference sources 120 can cause loss of signal tracking, degraded tracking, inaccurate location determination, and/or the like, resulting in GNSS calculations with less or no accuracy, debilitating the ability of various entities (e.g., platforms 101-104, portable electronic device 105) to successfully perform navigation and/or targeting operations.

A spherical coordinate system is now described. The spherical coordinate system includes azimuth and elevation. Angles in azimuth may be between 0 to 360 degrees. The angle in azimuth may be denoted by the letter phi ($\phi$) or AZ. Angles in elevation from horizon may be between –90 degrees and 90 degrees. The angle in elevation may be denoted by the angle theta ($\Theta$) or EL. Elevation angles at 90 degrees may be referred to as zenith. Elevation angles at 0 degrees may be referred to as horizon.

GNSS antenna may be optimized to receive signals from the GNSS satellites 110 above 5 degrees elevation. Most unwanted jammer or spoofing signals will be below 15 degrees elevation. The interference sources 120 are typically ground based interference sources. Signals received at elevation angles above the low-elevation angle may indicate the signal received are from a transmitter which is located above the stratosphere (e.g., satellites). For example, the low-elevation angle may refer to an elevation of at or below 15 degrees above horizon. By way of another example, the low-elevation angle may refer to an elevation greater than 85 degrees below zenith (i.e., from –90 to 15 degrees).

Polarization in the context of the airborne platforms 101 is now described. Electromagnetic waves may travel from an elevation angle based on a position of the transmitter and a position of a receiver. For example, the satellites 110 may include the transmitter and the airborne platform 101 may include the receiver. The electromagnetic waves transmitted from the satellites 110 to the airborne platform 101 may be at a relatively high elevation angle near zenith. The electromagnetic waves may maintain circular polarization due to minimal interaction between the electromagnetic waves and the metal fuselage of the airborne platform 101. By way of another example, the interference sources 120 may include the transmitter and the airborne platform 101 may include the receiver. The electromagnetic waves transmitted from the interference sources 120 to the airborne platform 101 may be at the low elevation angle. The electromagnetic waves may be transmitted with the circular polarization to mimic or spoof the signals from the satellites 110. However, the electromagnetic waves from the interference sources 120 arrive at the low elevation angle and travel along the metal fuselage of the airborne platform 101. The electromagnetic wave traveling along the metal fuselage may cause a horizontal component of the electromagnetic wave to be shorted out by the metal fuselage. The electromagnetic wave may then arrive to an antenna of the airborne platform 101 as vertically polarized even though the electromagnetic wave was transmitted with as right-hand circular polarization. Thus, the interference sources 120 may only contribute signals having the vertical polarization.

Figure 2:
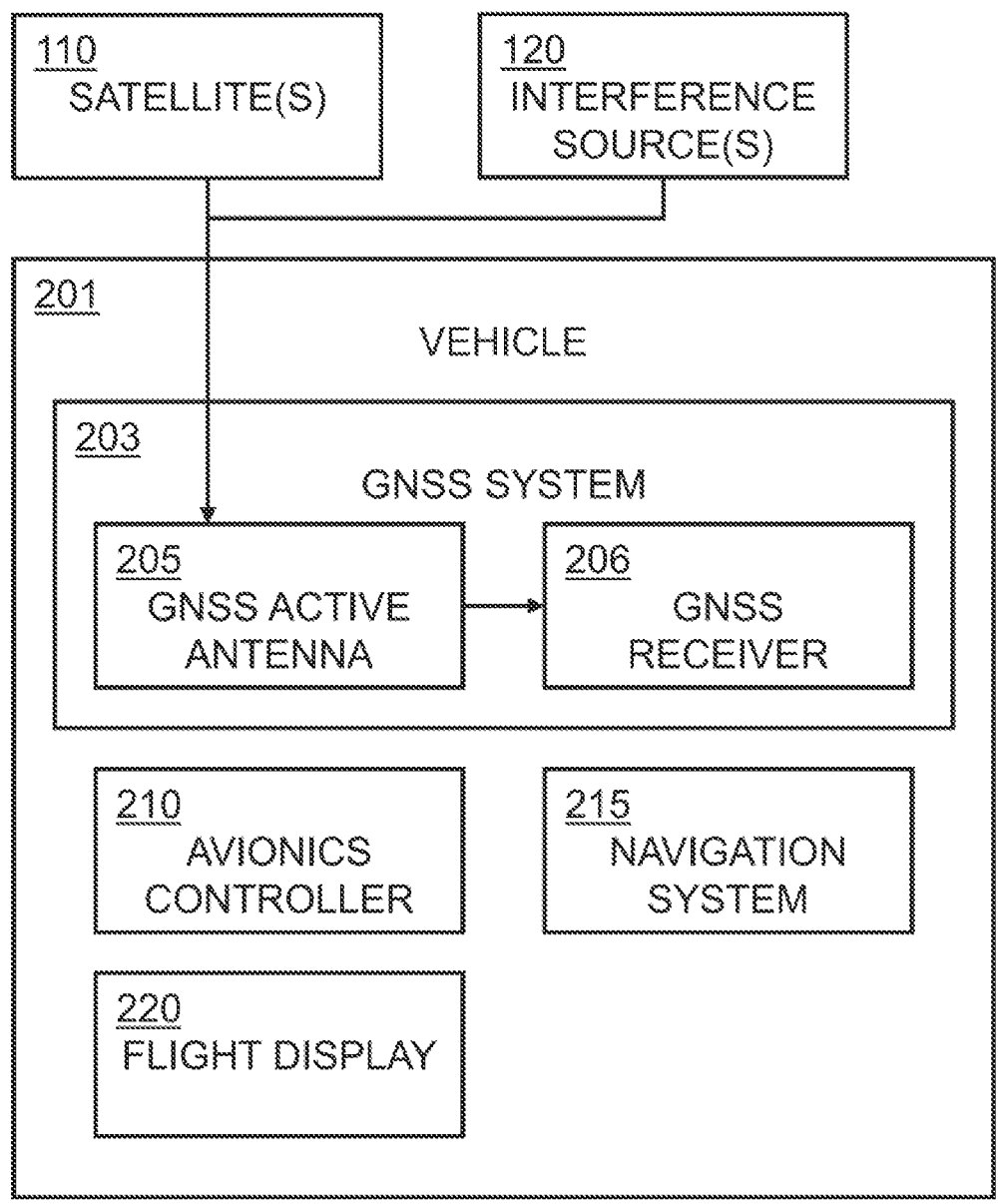
FIG. 2 depicts a simplified block diagram of a vehicle including a GNSS active antenna and a GNSS receiver, in accordance with one or more embodiments of the present disclosure.

Referring now to FIG. 2, a block diagram of a system 200 is shown according to an exemplary embodiment of the present disclosure. The system 200 can be configured to calculate a range to one or more satellites 110 (e.g., GNSS satellites), such as for determining the location of a vehicle 201 or an electronic device associated with the vehicle 201. The vehicle 201 may include any of the platforms 101-105. In embodiments, the vehicle 201 can be any suitable vehicle, platform, or device that uses GNSS/GPS based location tracking.

The vehicle 201 may include a GNSS system 203. The GNSS system 203 may include a GNSS active antenna 205 and a GNSS receiver 206.

The GNSS active antenna 205 may receive GNSS signals from the satellites 110. In embodiments, the GNSS active antenna 205 is configured to receive incoming signals including radio frequency satellite signals from the one or more satellites 110. The radio frequency satellite signals may also be referred to as GNSS signals. The GNSS signals may include, but are not limited to, GPS signals (e.g., L1 signals, L2 signals, and/or L5 signals). The GNSS active antenna 205 can include one or more antennas configured to receive radio frequency signals, as will be described further herein.

The GNSS receiver 206 may be coupled to the GNSS active antenna 205. The GNSS receiver 206 may perform GNSS based location tracking using the GNSS signals the GNSS active antenna 205 receives from the satellites 110. The GNSS receiver 206 may simultaneously process multiple GNSS signal frequencies/constellations (e.g., L1 signals, L2 signals, and/or L5 signals, GLONASS etc.). The GNSS receiver 206 can be configured to execute computational processes on the received radio frequency signals, including determining a location associated with the GNSS receiver 206 based on processing one or more received radio frequency signals. The GNSS receiver 206 can execute signal tracking channels which correlate the received radio frequency signals to predetermined code signals in order to calculate pseudorange values (e.g., code position measurements, carrier phase measurements, and/or the like) corresponding to each satellite 110. The GNSS receiver 206 can be configured to generate and output various information, such as time, velocity, and position data regarding the GNSS receiver 206 using the pseudorange values.

The GNSS active antenna 205 may also receive signals from the interference sources 120. The signals from the interference sources 120 may impact the ability of the GNSS receiver 206 to perform location tracking. The GNSS active antenna 205 may include one or more features to improve the ability of the GNSS receiver 206 to perform location tracking using the GNSS signals from the satellites 110 when within range of the interference sources 120. For example, the GNSS active antenna 205 may control a radiation pattern of one or more antennas. The GNSS active antenna 205 may control the radiation pattern for jamming and/or spoofing resistance.

In embodiments, the GNSS active antenna 205 is configured to detect interference (e.g., RF interference) and/or a spoofed signal on the received radio frequency signals. In particular, the GNSS active antenna 205 may detect the azimuth angle of the interference sources 120. For example, the GNSS active antenna 205 may detect the interference and/or the spoofed signal by scanning a null in azimuth and measuring the received signal level. The received signal level may be lowest with the null in the direction of the interference sources 120. The GNSS active antenna 205 may then null the vertically polarized electromagnetic waves received from the interference sources 120 at the low-elevation angle. The GNSS active antenna 205 may be configured to null the electromagnetic waves received from one of the interference sources 120 at a time. Commercial applications may typically experience only one jammer at a time. In this regard, the GNSS active antenna 205 may be beneficial to a number of commercial applications, such as, but not limited to, commercial aviation.

Although the GNSS active antenna 205 is described as detecting the interference and/or the spoofed signal, this is not intended as a limitation of the present disclosure. The GNSS receiver 206 may detect the interference and/or the spoofed signal. The GNSS receiver 206 may then communicate the direction of the interference source 120 to the GNSS active antenna 205 for nulling the radiation pattern in the direction of the interference source 120. For example, the GNSS receiver 206 may communicate the direction of the interference source 120 to the GNSS active antenna 205 over an interface.

In embodiments, the vehicle 201 is described in the context of the airborne platform 101. The GNSS system 203 including the GNSS active antenna 205 and the GNSS receiver 206 can be integrated with the airborne platform 101. For example, the systems and methods for GNSS processing described herein can be associated with avionics controllers or other critical electronic devices, such as those in an aircraft cockpit or control center, of the airborne platform 101. In this case, the vehicle 201 includes the GNSS system 203 (with the GNSS active antenna 205, the GNSS receiver 206), an avionics controller 210, a navigation system 215, a flight display 220, and the like. The GNSS based location tracking may then be utilized in a number of control systems for various types of electronic avionics applications for airborne platforms (e.g., aircraft), including but not limited to flight control and autopilot systems, navigation systems, flight display systems, communications systems, radar systems, airborne collision avoidance system, electric power systems, engine control systems, monitor warning systems, and/or the like. In embodiments, the navigation system 215 may use the position data to execute navigation functions. For example, the navigation system 215 can use the position data to display a location of the aircraft 201 (which can be an actual location or estimated location depending on the detection of interference and/or spoofing), to update a flight plan, to calculate distances and ranges to remote locations or targets, to calculate state data (e.g., speed, heading), and/or the like.

However, the present disclosure is not limited thereto, and as noted above, the inventive concepts disclosed herein may be implemented in various platforms including ground-based platforms or portable electronic devices. For example, the avionics controller 210 in various embodiments may be configured as a controller specific to the platform implemented on the vehicle 201, and/or one or more component shown in FIG. 2 can be omitted or variously modified depending on the type of vehicle, platform, or device. For example, the vehicle 201 can be the airborne platform 101, the ground-based (e.g., stationary) platform 102 (e.g., a ground station), the mobile ground platform 103, the maritime platform 104, the portable electronic device 105 (e.g., handheld device) described with reference to FIG. 1, and/or any other suitable vehicle, platform, or device.

Figure 3A:
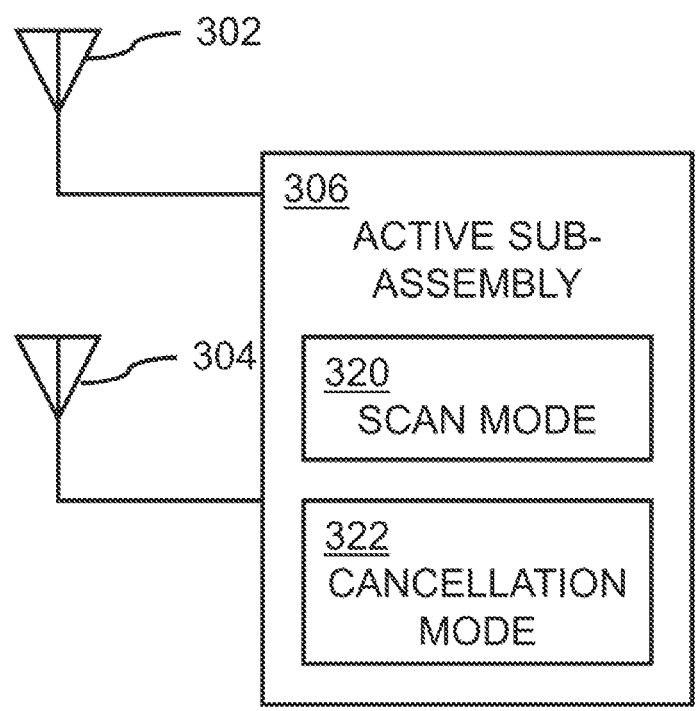
FIGS. 3A-3B depicts a block diagram of GNSS active antenna including a microstrip patch antenna with a concentric monopole antenna, in accordance with one or more embodiments of the present disclosure.
Figure 3B:
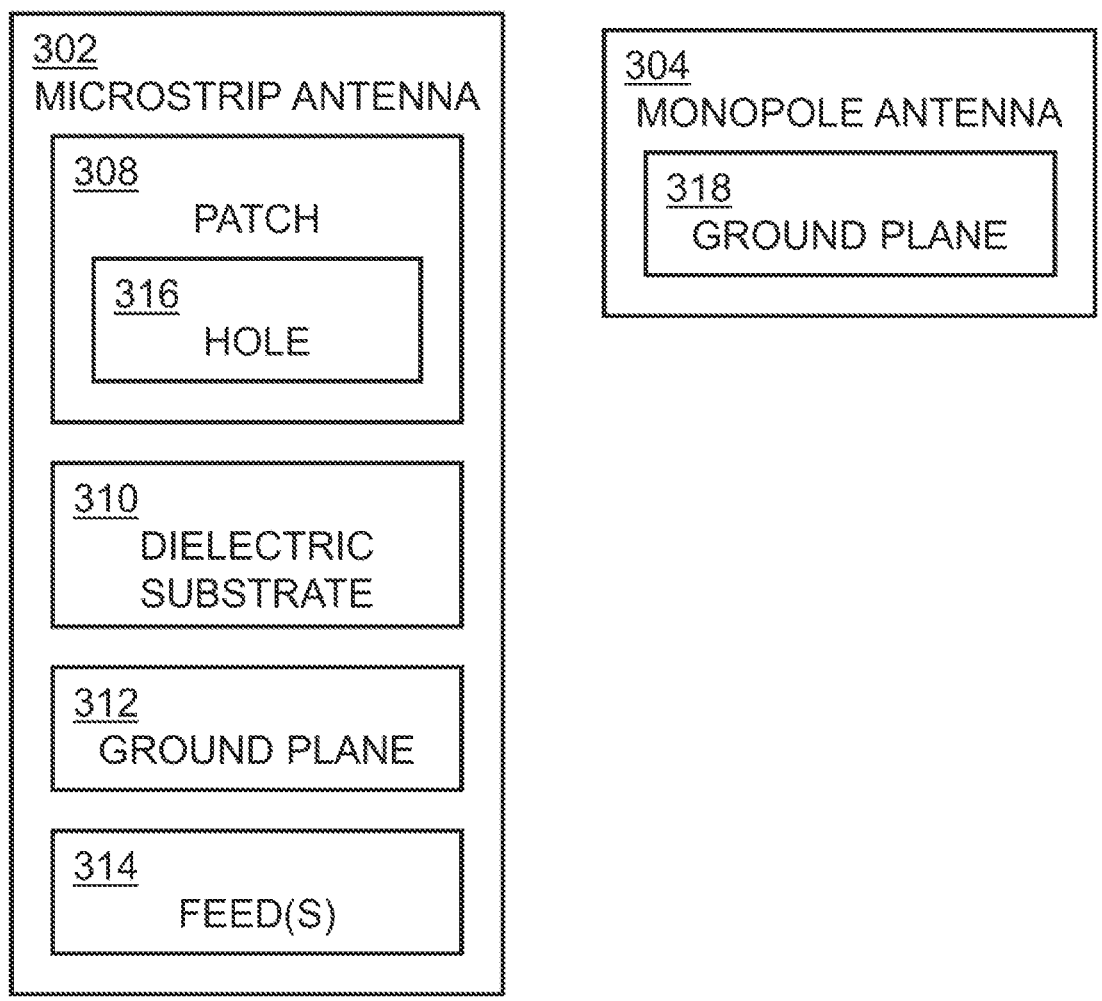

Referring now to FIGS. 3A-3B, a simplified block diagram of the GNSS active antenna 205 is described, in accordance with one or more embodiments of the present disclosure. The GNSS active antenna 205 may include, but is not limited to, a microstrip antenna 302, a monopole antenna 304, an active sub-assembly 306, and the like.

In embodiments, the monopole antenna 304 may be concentric with a center of the microstrip antenna 302. Antennas may exhibit parasitic couplings with adjacent antennas in close proximity. Parasitic refers to one antenna element impacting the radiation pattern of another element. The parasitic coupling may induce undesired interactions between the antennas degrading performance. In embodiments, the monopole antenna 304 is concentric with the center of the microstrip antenna 302. The placement of the monopole antenna concentric with the center of the microstrip antenna 302 may reduce or eliminate any parasitic coupling between the microstrip antenna 302 and the monopole antenna 304.

In embodiments, the microstrip antenna 302 is right-hand circular polarized (RHCP). In embodiments, the monopole antenna 304 is vertical polarized. Antennas may be considered to have a given polarization when a signal having the polarization results in a maximum power at the antenna terminals. The polarization of the antennas may also be referred to as a receiving polarization of the antennas.

In embodiments, the active sub-assembly 306 is coupled to the microstrip antenna 302 and the monopole antenna 304. The active sub-assembly 306 may perform one or more functions on radio frequency (RF) signals received from the microstrip antenna 302 and the monopole antenna 304. The active sub-assembly 306 may be configured to perform one or more functions, such as, but not limited to, filtering, amplifying, mixing, combining, splitting, phase adjustment, attenuations, null steering, signal detection, demodulation, and the like.

The active sub-assembly 306 may include one or more components (see FIGS. 8A-8B), such as, but not limited to, band-pass filters, low-noise amplifiers, power dividers, power combiners, attenuators, phase shifters, switches, detectors, microcontrollers, and the like. In embodiments, any of the various components are physical components such that the active sub-assembly 306 may also be referred to as an RF front-end. In embodiments, the active sub-assembly 306 may include one or more integrated circuits with any of the various components. In embodiments, any of the various components are implemented digitally.

In embodiments, the active sub-assembly 306 is configured to operate in a scan mode 320 and a cancellation mode 322. The discussion of the scan mode 320 and the cancellation mode 322 may be further understood with reference to FIGS. 8A-8B and FIGS. 10A-10B. In scan mode 320, the monopole antenna 304 is disconnected from the output by switch 824 and the detector 832 is connected to a monitor path by switch 830. In scan mode 320, the monopole antenna 304 has no effect on the active antenna output 814 and the active antenna 205 performs like a standard airborne antenna. In scan mode 320, the detector 832 can scan for low-elevation interference sources without changing the output of the active antenna output 814 to the GNSS receiver 206. Once an interference source has been detected, the GNSS active antenna 205 can switch to cancellation mode 322. The GNSS active antenna 205 may switch to the cancellation mode 322 by toggling switch 824 and switch 830. In cancellation mode 322, the outputs from the monopole antenna 304 and microstrip antenna 302 are combined to produce a controlled radiation pattern with a null in the direction of the interference source 120. The null in the direction of the interference source may reduce the level of the unwanted interference on the active antenna output 814. In the cancellation mode 322, the detector 832 is connected to the active antenna output 814 through the power divider 812 enabling continuous optimization of the null.

In embodiments, the GNSS active antenna 205 may be compliant with one or more GNSS standards. The GNNS active antenna 205 may be compliant with Radio Technical Commission for Aeronautics (RTCA) Document 301 (DO-301), titled "Minimum Operational Performance Standards for Global Navigation Satellite System (GNSS) Airborne Active Antenna Equipment for the L1 Frequency Band". The GNSS active antenna 205 may be compliant with any RTCA documents regarding other GNSS frequencies and/or constellations, such as, but not limited to, RTCA DO-228 titled "Minimum Operational Performance Standards for Global Navigation Satellite Systems (GNSS) Airborne Antenna Equipment", RTCA DO-310, RTCA DO-373 titled "MOPS for GNSS Airborne Active Antenna Equipment for the L1/E1 and L5/E5a Frequency Bands", RTCA DO-368 titled "Minimum Operational Performance Standards for GPS/GLONASS (FDMA+antenna) L1-only Airborne Equipment", and the like.

In embodiments, the GNSS active antenna 205 may be compliant with the passive GNSS antenna section of RTCA DO-301. The GNSS active antenna 205 may be compliant with any of requirements for passive GNSS antenna in RTCA DO-301, such as, but not limited to, operating frequencies, radiation patterns, polarizations, gain, and the like, as will be described. The GNSS active antenna 205 may be compliant with the various requirements when the monopole antenna 304 is disconnected from the output path (i.e., when the active sub-assembly 306 is in the scan mode 322). In this regard, the GNSS active antenna 205 may exhibit minimum operational performance standards (MOPS) when the monopole antenna 304 is disconnected from the output path.

The GNSS active antenna 205 may include an operating frequency which is compliant with the passive GNSS antenna gain requirements of RTCA DO-301 when the monopole antenna 304 is disconnected from the output path. The operating frequency may be based on the GNSS signals. In embodiments, the GNSS active antenna 205 may include a frequency of 1575.42 MHz±10.23 MHz (i.e., L1), a frequency of 1227.60 MHz±10.23 MHz (i.e., L2), and/or a frequency of 1176.45 MHz±10.23 MHz (i.e., L5). In embodiments, example, the GNSS active antenna 205 may operate in a band of 4 MHz centered around a carrier frequency of 1575.42 MHz (i.e., L1). The GNSS active antenna 205 may be considered to include a frequency by the microstrip antenna 302 and/or the monopole antenna 304 resonating at the frequency. The active sub-assembly 306 may filter signals which are out-of-band of the frequency. For example, out-of-band may refer to frequencies which are outside of the bandwidth of L1, L2, and/or L5.

The GNSS active antenna 205 may include radiation pattern characteristics which are compliant with the passive GNSS antenna gain requirements of RTCA DO-301 when the monopole antenna 304 is disconnected from the output path. For example, the GNSS active antenna 205 may include omnidirectional upper hemispheric radiation pattern when the monopole antenna is disconnected from the output path. A radiation pattern may refer to a directional dependence of the strength radio waves received by the GNSS active antenna 205. An omnidirectional radiation pattern may refer to a radiation pattern which is non-directional in a first plane (e.g., azimuth) and a directional pattern in a second plane orthogonal to the given plane (e.g., elevation). An omnidirectional hemispheric radiation pattern may refer to an omnidirectional radiation pattern in azimuth, with a gain increasing relative to horizon (e.g., above or below horizon). Upper hemispheric coverage may refer to a hemispheric radiation pattern with gain increasing above horizon. Thus, the omnidirectional upper hemispheric radiation pattern may refer to omnidirectional hemispheric radiation pattern which increases above the horizon.

The GNSS active antenna 205 may include antenna gain characteristics which are compliant with the passive GNSS antenna gain requirements of RTCA DO-301 when the monopole antenna 304 is disconnected from the output path. The passive antenna gain characteristics may define the radiation pattern characteristics. In particular, the antenna gain characteristics may define the gain for the omnidirectional upper hemispheric radiation pattern. For example, the GNSS active antenna 205 may include an antenna gain of greater than or equal to minus 2.0 dBic at 15 degrees elevation above the horizon when the monopole antenna 304 is disconnected from the output path. By way another example, the GNSS active antenna 205 may include an antenna gain of greater than or equal to minus 3.0 dBic at 10 degrees elevation above the horizon when the monopole antenna 304 is disconnected from the output path. By way another example, the GNSS active antenna 205 may include an antenna gain of greater than or equal to minus 4.5 dBic at five degrees elevation above the horizon when the monopole antenna 304 is disconnected from the output path. By way another example, the GNSS active antenna 205 may include an antenna gain of between minus 7.5 dBic and minus 5.0 dBic at zero degrees elevation when the monopole antenna 304 is disconnected from the output path. By way another example, the GNSS active antenna 205 may include a gain variation in azimuth at any elevation angle of five degrees or more above the horizon of less than 3 dB when the monopole antenna 304 is disconnected from the output path. The term dBic may refer to antenna gain in decibels (dB) relative to an isotropic antenna with circular polarization. The term dBic may also be referred to as absolute gain.

The GNSS active antenna 205 may also include one or more characteristics when the monopole antenna 304 is connected to the output path (i.e., in the cancellation mode 322). The active sub-assembly 306 may generate a controlled radiation pattern including a null. The active sub-assembly 306 may generate the controlled radiation pattern by combining signals or outputs from the microstrip antenna 302 and the monopole antenna 304. The null may be at an elevation. For example, the GNSS active antenna 205 may include a null at or below an elevation of 15 degrees above horizon when the monopole antenna 304 is connected to the output path. The active sub-assembly 306 may steer the null in azimuth. For example, the null may refer to an antenna gain of between minus 20.0 dBic and minus 25 dBic at zero degrees elevation directed at any angle in azimuth. The null may be much lower than the antenna gain of the GNSS active antenna 205 when the monopole antenna 304 is disconnected from the output path. For example, the GNSS active antenna 205 may include the antenna gain between minus 7.5 dBic and minus 5.0 dBic at zero degrees elevation of when the monopole antenna 304 is disconnected from the output path.

In embodiments, the active sub-assembly 306 is configured to generate the controlled radiation pattern with the null by destructively combining the outputs from the concentric monopole 304 with the outputs from the microstrip antenna 302 in the null direction. The active sub-assembly 306 may adjust the gain and phase of the signal from the monopole antenna 304 to generate an attenuated and phase-shifted output. The attenuated and phase-shifted output may then be combined with the outputs from the microstrip antenna 302. The gain and phase of the output from the monopole antenna 304 may be adjusted to maximize the null in the direction in azimuth and elevation of the interferer. For example, the gain and phase of the output may be adjusted such that the signal from the monopole antenna 304 destructively combines with the signal from the microstrip antenna 302 at the selected azimuth and elevation.

In embodiments, the active sub-assembly 306 is configured to detect a signal from the interfering sources 120. The active sub-assembly 306 may then steer the null in the direction of the interfering sources 120 to null the signal strength from the interfering sources 120. Steering the null may refer to directing a null at a select angle in azimuth for nulling reception of signals at the angle.

Referring now in particular to FIG. 3B, the microstrip antenna 302 and the monopole antenna 304 are described. The microstrip antenna 302 may include one or more of a patch 308, dielectric substrate 310, ground plane 312, and/or feeds 314. The monopole antenna 304 may also include a ground plane 318.

In embodiments, the patch 308 may include a shape, such as, but not limited to, a rectangle, a square, a circle, an ellipse, a triangle, and the like. The patch 308 may also be considered a perturbed patch. For example, the perturbed patch may include one or more edge perturbations (e.g., truncated corners), slots, and the like. In embodiments, the patch 308 may be formed of any conductive material. The conductive material may be a metal, such as, but not limited to, copper.

In embodiments, the microstrip antenna 302 may be right-hand circular polarized. In embodiments, the patch 308 may be coupled to the one or more feeds 314. The one or more feeds 314 may couple the patch 308 to the active sub-assembly 306. The one or more feeds 314 may control the polarization of the microstrip antenna 302. The microstrip antenna may include any feed design for right-hand circular polarization, such as, but not limited to, probe fed (e.g., single probe fed, dual probe fed, quad probe fed), aperture coupled, microstrip fed, and the like. For example, the single probe feed may include a single feed which is set at a diagonal to the midpoint. The single feed may include two modes, which are 90 degrees out of phase. In embodiments, the feeds 314 may include a coaxial probe, a microstrip transmission line, or the like.

In embodiments, the patch 308 may be disposed on the dielectric substrate 310. The dielectric substrate 310 may include a height and a dielectric constant. The dielectric constant may also be referred to as permittivity. The permittivity may be denoted by epsilon (E). The patch 308 and the dielectric substrate 310 may define a resonant cavity for one or more radio frequencies (e.g., GNSS signals). In embodiments, the microstrip antenna 302 may resonate at the operating frequency of the GPS positioning signals. For example, the microstrip antenna 302 may resonate at the operating frequency of L1, L2, and/or L5. The size of the patch 308 may be selected as a function of frequency of operation, the dielectric constant, and the like.

In embodiments, the microstrip antenna 302 may define a hole 316. The hole 316 may be disposed at a midpoint of the patch 308. The midpoint of the patch 308 may refer to a centermost point on the patch 308. In embodiments, the monopole antenna 304 is disposed in the hole 316 and concentric with the patch 308. Concentric may refer to the patch 308 completely enclosing the monopole antenna 304. For example, the interior surface of the microstrip antenna 302 defining the hole 316 may enclose a portion of the monopole antenna 304. The monopole antenna 304 may then extend from the patch 308. Providing the monopole antenna 304 concentric to the microstrip antenna 302 may provide minimal to no impact on the performance of the microstrip antenna 302.

The monopole antenna 304 may be vertically polarized. The monopole antenna 304 may include any suitable monopole with a vertical polarization. For example, the monopole antenna 304 may include, but is not limited to, a simple monopole, a disk-loaded monopole, and the like. The simple monopole may refer to a straight conducting rod. The disk-loaded monopole may refer to a simple monopole which extend in a first direction (e.g., z-direction) and a disk coupled to the simple monopole which extends outwards in a plane perpendicular to the first direction (e.g., x-y plane). The use of the disk-loaded monopole may be advantageous, as compared to the simple monopole. For example, the disk-loaded monopole may include a reduced height in the first direction. The height and/or diameter of the disk-loaded monopole may be selected to achieve a given frequency for the monopole antenna 304.

The ground plane 312 and/or the ground plane 318 may be a conducting surface. The ground plane 312 may be a planar surface which conducts GNSS signals for the patch 308. The ground plane 318 may a planar surface which conducts GNSS signals for the monopole antenna 304. The ground planes may include a surface area which is large relative to the wavelength of the GNSS signals from the satellites 110. In embodiments, the ground plane 312 and the ground plane 318 are a common surface. For example, the ground plane 312 and/or the ground plane 318 may be a metal fuselage of the airborne platform 101, although this is not intended to be limiting.

Figure 4A:
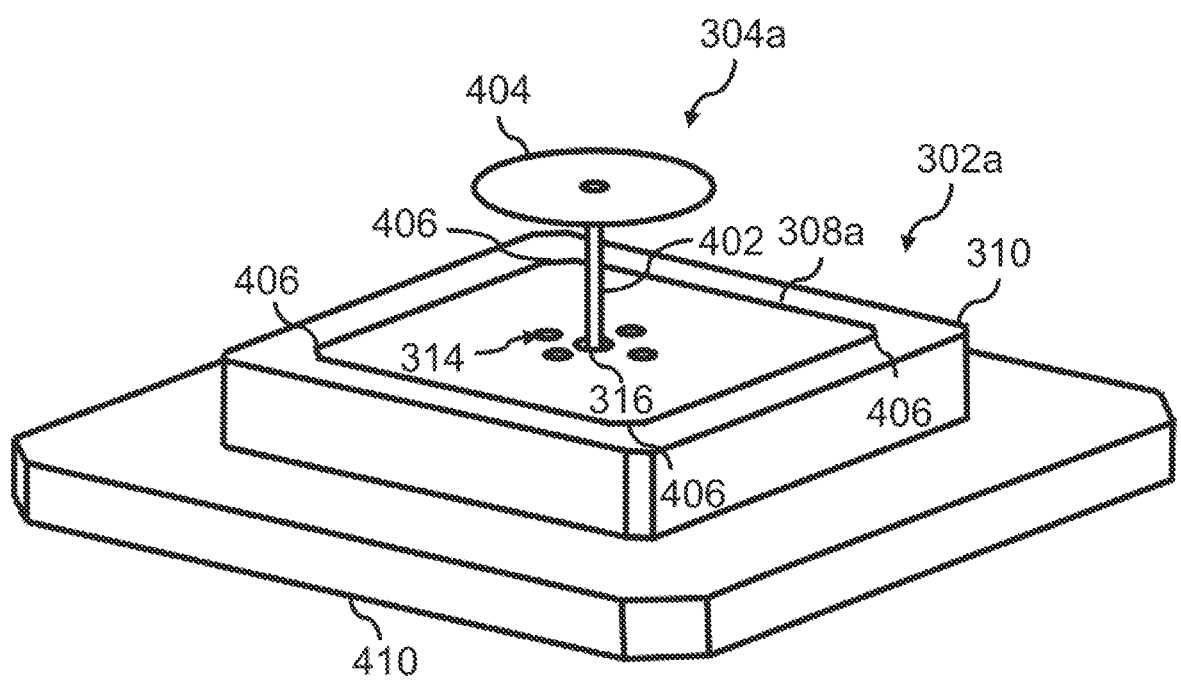
FIG. 4A depicts a perspective view of a GNSS passive antenna including a microstrip patch antenna with a concentric monopole antenna, in accordance with one or more embodiments of the present disclosure.
Figure 4B:
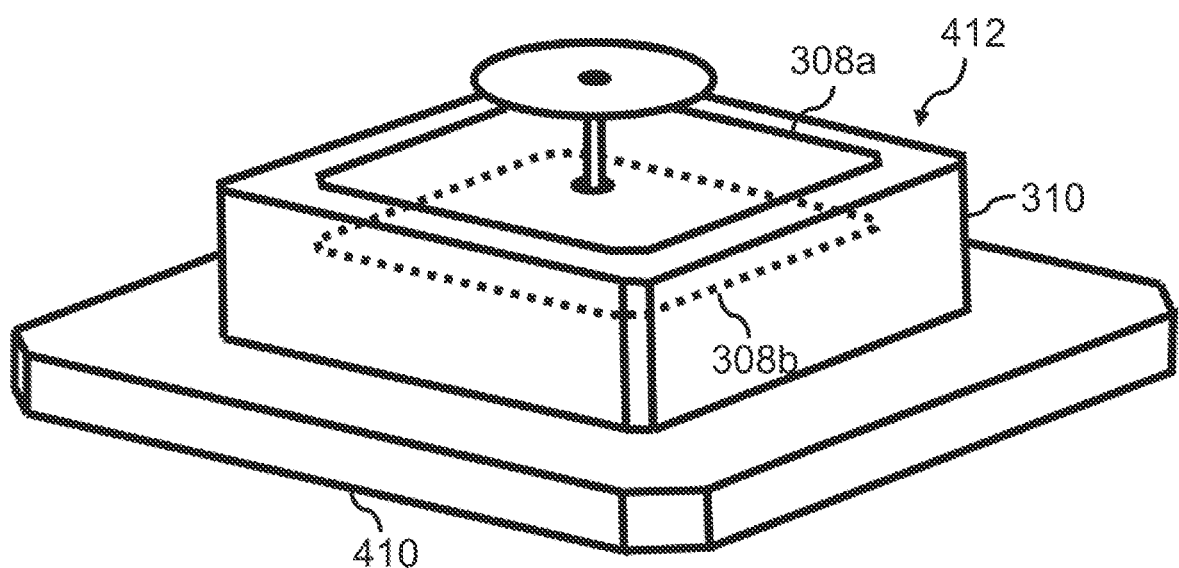
FIG. 4B depicts a perspective view of a GNSS passive antenna including a stacked microstrip antenna with a concentric monopole antenna, in accordance with one or more embodiments of the present disclosure.

Referring now to FIGS. 4A-4B, a GNSS passive antenna 400 is described, in accordance with one or more embodiments of the present disclosure. The GNSS passive antenna 400 may include a microstrip antenna 302a and a monopole antenna 304a. In this regard, the GNSS passive antenna 400 may provide one example of the microstrip antenna 302 and the monopole antenna 304 of the GNSS active antenna 205. As depicted, the microstrip antenna 304a is a quad-probe feed patch with four of the feeds 314. The feeds 314 may then be coupled to pins of a circuit card 410. As depicted, the patch 308a is a square patch including truncated corners 406.

As depicted, the monopole antenna 304a is a disk-loaded monopole. The monopole antenna 304a may include a simple monopole 402 and a disk 404. The simple monopole 402 is disposed in the hole 316 and concentric with the patch 308a. The simple monopole 402 is coupled to a pin of the circuit card 410. The simple monopole 402 extends from microstrip antenna 302a. In embodiments, zenith may be considered upwards from the patch 308. The simple monopole 402 may extend from the patch 308a towards zenith. The disk 404 is parallel to the patch 308a. The distance between the patch 308a and the disk 404 is based on the length of the simple monopole 402. In embodiments, the size of the disk 404 may be selected to avoid coupling with the patch 308.

In embodiments, the microstrip antenna 302a may include a stacked microstrip antenna 412 (see FIG. 4B). The stacked microstrip antenna 412 may include the patch 308a and a patch 308b. The stacked microstrip antenna 412 may include the patch 308a and a patch 308b. The patch 308a may be disposed on top of the dielectric substrate 310. The patch 308b may be disposed within the dielectric substrate 310. For example, the patch 308b may be disposed between layers of the dielectric substrate 310. The patch 308b may be driven by the feed 314. The patch 308b may couple with the patch 308a. The coupling with the patch 308a may increase the bandwidth of the patch 308b. In embodiments, the patch 308b may support two or more frequencies. For example, the patch 308b may receive GPS L1 and GPS L5, although this is not intended to be limiting. The monopole antenna 304a may be concentric to both the patch 308a and the patch 308b. The patch 308a and the patch 308b may each include the hole 316 for the simple monopole 402.

Referring generally to FIGS. 6A-7B, one or more simulation results are described, in accordance with one or more embodiments of the present disclosure. The simulation results may provide various characteristics of the GNSS passive antenna 400 including the microstrip antenna 302a and the monopole antenna 304a. The simulation results are for the GNSS passive antenna 400 operating at GPS L1 or a frequency of 1575.4 MHz. The polar plot 502 and the polar plot 504 each include radial numbers going from 0.0 to −25.0. The radial numbers indicate a gain in decibels (dB). The polar plot 502 and the polar plot 504 include an azimuth angle in degrees from −180 to 180 degrees. Such angle may also be converted to 0 to 360 degrees.

Figure 5A:
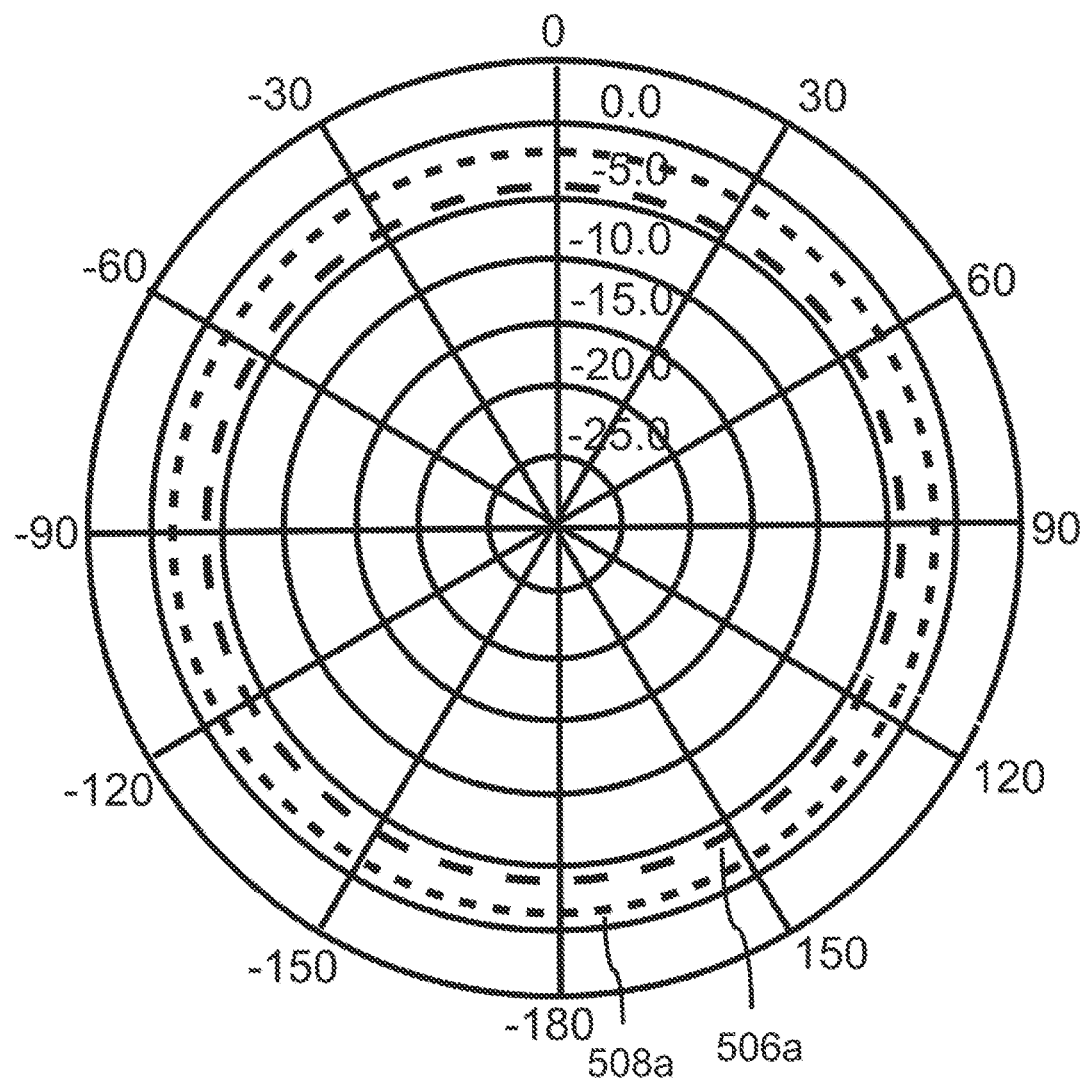
FIG. 5A depicts an azimuth polar plot of a GNSS passive antenna with a concentric monopole antenna disconnected from an output path, in accordance with one or more embodiments of the present disclosure.
Figure 5B:
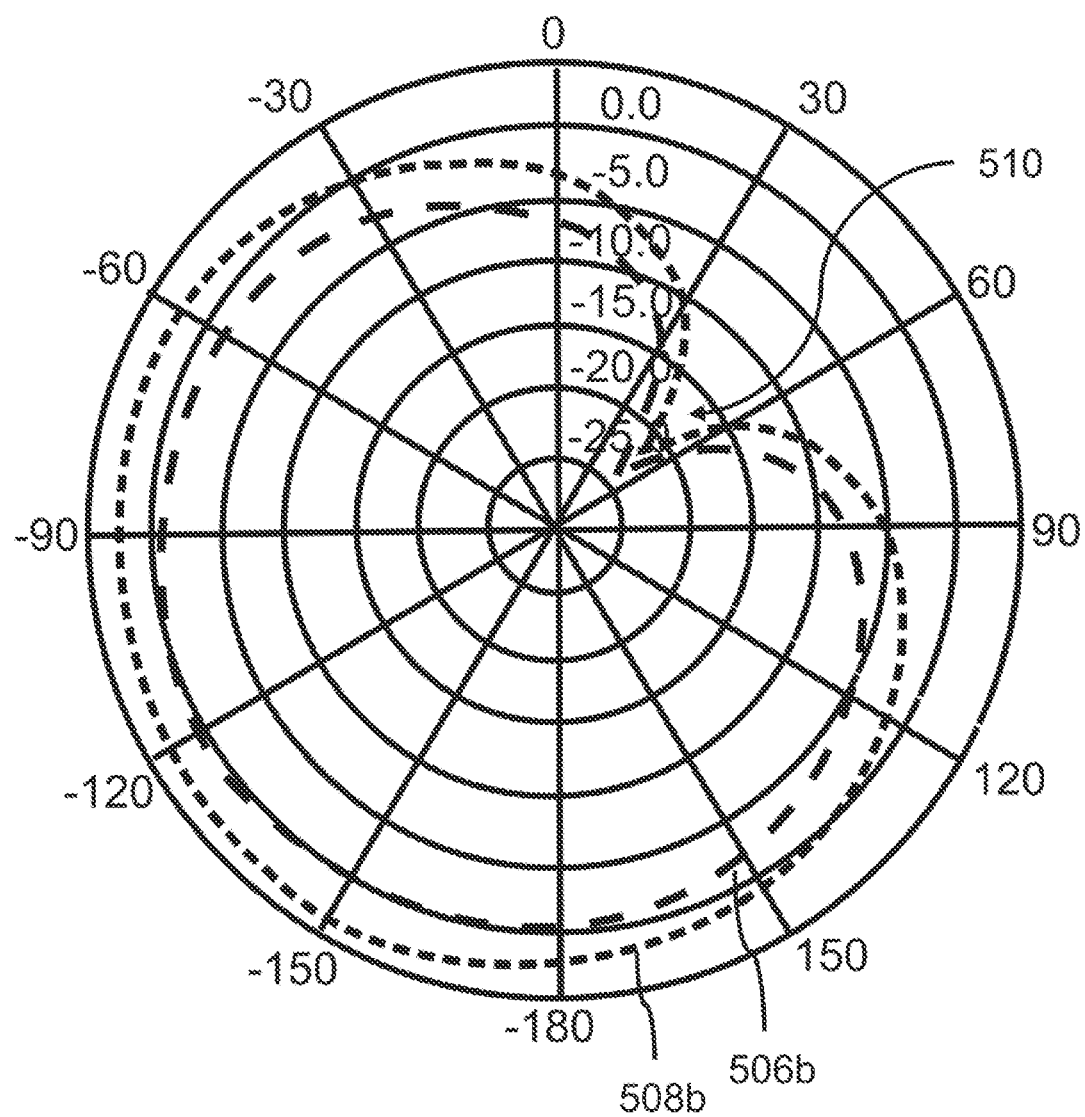
FIG. 5B depicts an azimuth polar plot of a GNSS passive antenna with a concentric monopole antenna connected to an output path to generate a controlled radiation pattern with a null, in accordance with one or more embodiments of the present disclosure.

Referring now to FIGS. 5A-5B, a polar plot 502 and a polar plot 504 are described, in accordance with one or more embodiments of the present disclosure. The polar plot 502 and the polar plot 504 are each at azimuth (e.g., an elevation of zero degrees). The polar plot 502 and the polar plot 504 include an azimuth angle in degrees from −180 to 180 degrees. The polar plot 502 and the polar plot 504 each include radial numbers going from 0.0 to −25.0. The radial numbers indicate a gain in decibels (dB). The polar plot 502 and the polar plot 504 may each include a radiation pattern 506 (e.g., radiation pattern 506a-506b) and a radiation pattern 508 (e.g., radiation pattern 508a-508b). The radiation pattern 506 may refer to right-hand circular polarized gain. The radiation pattern 508 may refer to gain from any polarization or a total gain. The radiation pattern 508 may include a larger gain than the radiation pattern 506.

The polar plot 502 may depict an azimuth polar plot of the GNSS passive antenna 400 with the monopole antenna 304a disconnected from the output path. The polar plot 502 is omnidirectional in azimuth. The gain of the radiation pattern 508a may be between minus 7.5 dBic and minus 5.0 dBic. The polar plot 502 may be a portion of an omnidirectional upper hemispheric radiation pattern.

The polar plot 504 may depict an azimuth polar plot of the GNSS passive antenna 400 with the monopole antenna 304a connected to the output path. The polar plot includes a null 510. The null 510 includes an antenna gain of between minus 20.0 dBic and minus 25 dBic at the zero degrees elevation. As depicted, the null 510 is directed at around 50 degrees in azimuth, although this angle is not intended to be limited. The null 510 may be directed to any angle in azimuth. The null 510 may be directed to reduce the strength of unwanted (e.g., the jamming/spoofing) signals. The null 510 may be directed in elevation and azimuth towards the interfering signal to reduce the gain from the interfering signal without significantly reducing the gain of the desired higher elevation GNSS signals.

Figure 6A:
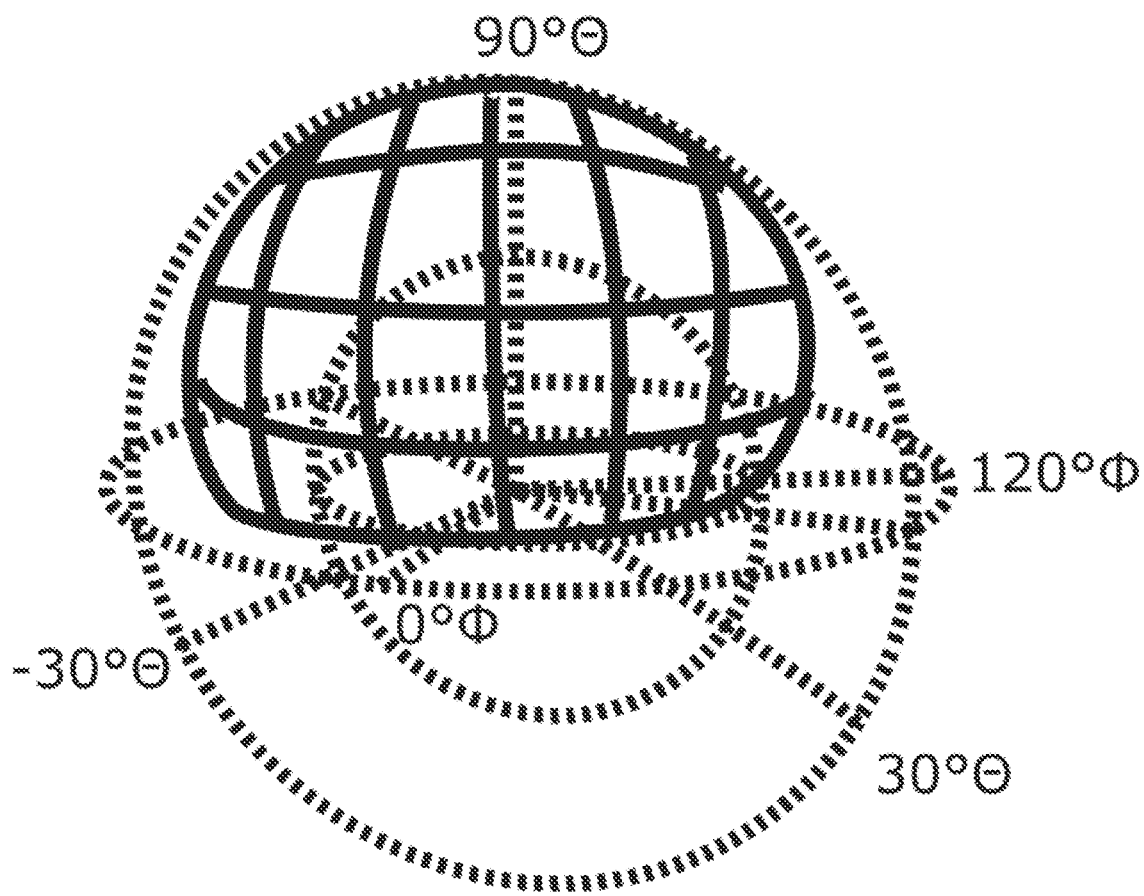
FIG. 6A depicts a 3-dimensional radiation pattern or an omnidirectional upper hemispheric radiation pattern of a GNSS passive antenna with a concentric monopole antenna disconnected from an output path, in accordance with one or more embodiments of the present disclosure.
Figure 6B:
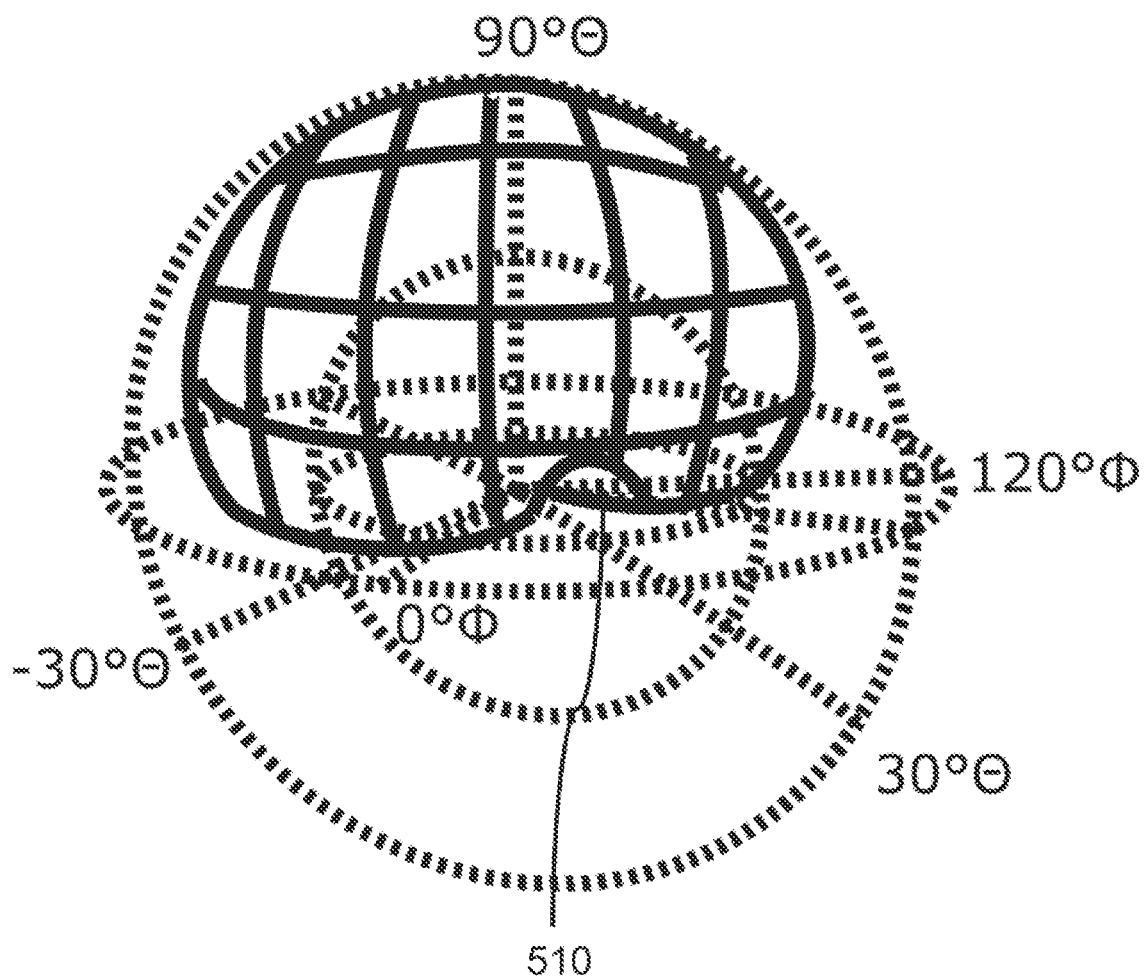
FIG. 6B depicts a 3-dimensional radiation pattern or a controlled radiation pattern of a GNSS passive antenna with a concentric monopole antenna connected to an output path to steer a low-elevation null, in accordance with one or more embodiments of the present disclosure.

Referring now to FIGS. 6A-6B, a radiation pattern 602 and a radiation pattern 604 are described, in accordance with one or more embodiments of the present disclosure. The radiation pattern 602 and the radiation pattern 604 are depicted in three-dimensions including an azimuth angle (e.g., phi) and an elevation angle (e.g., theta). (e.g., an elevation of zero degrees).

The radiation pattern 602 may depict the radiation pattern of the GNSS passive antenna 400 with the monopole antenna 304a disconnected from the output path. The radiation pattern 602 may be considered an omnidirectional upper hemispheric radiation pattern. The radiation pattern 602 may include a maximum gain of 6.43 dB and a minimum gain of −4.79 dB, although this is not intended to be limiting.

The radiation pattern 604 may depict the radiation pattern of the GNSS passive antenna 400 with the monopole antenna 304a connected to the output path. The radiation pattern 604 may be a controlled radiation pattern including the null 510. The radiation pattern 604 may include a maximum gain of 5.77 dB and a minimum gain of −37.82 dB, although this is not intended to be limiting. The minimum gain may be directed at the null 510.

Figure 7:
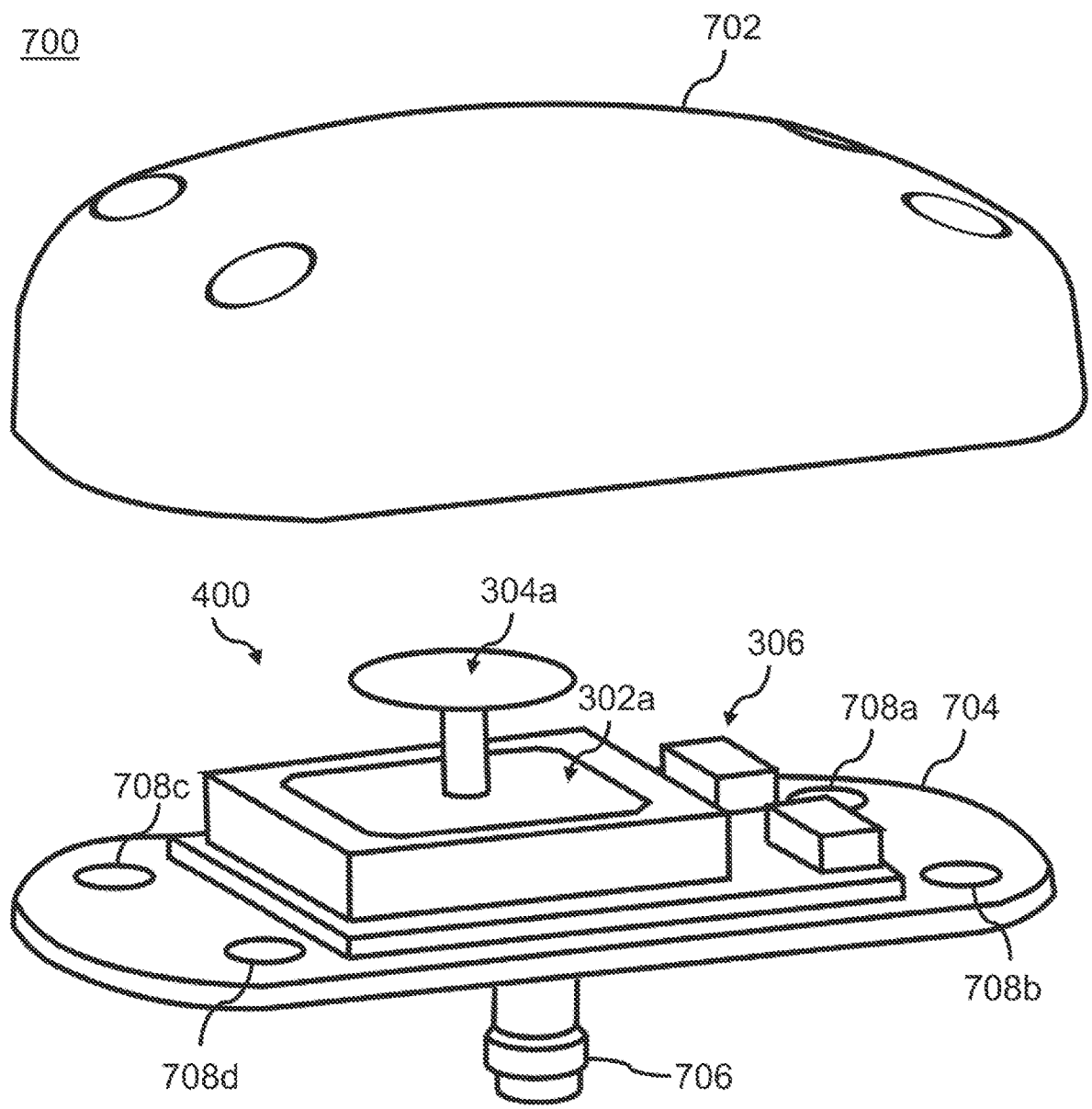
FIG. 7 depicts a partial exploded view of a GNSS active antenna, in accordance with one or more embodiments of the present disclosure.

Referring now to FIG. 7, an exploded view of a GNSS active antenna 700 is described, in accordance with one or more embodiments of the present disclosure. The GNSS active antenna 700 may be one example of the GNSS active antenna 205. The GNSS active antenna 700 may include one or more of the microstrip antenna 302 (e.g., microstrip antenna 302a), the monopole antenna 304 (e.g., monopole antenna 304a), the active sub-assembly 306, the GNSS passive antenna 400, a radome 702, a plate 704, connector 706, and the like.

In embodiments, the radome 702 may enclose the microstrip antenna 302, the monopole antenna 304, and the active sub-assembly 306. The microstrip antenna 302, the monopole antenna 304, and the active sub-assembly 306 may be enclosed between the radome 702 and the plate 704. The radome 702 may also provide environmental protection to the microstrip antenna 302, the monopole antenna 304, and the active sub-assembly 306. In embodiments, the radome 702 may include a contoured shape.

In embodiments, the GNSS active antenna 700 may include an ARINC 743 footprint. For example, the GNSS active antenna 700 may include an ARINC 743A-5 footprint. In embodiments, the plate 704 may include a length of 4.90 inches by 2.90 inches. In embodiments, the plate 704 may define one or more holes 708 (e.g., holes 708a-708d). A distance between the hole 708a and the hole 708b and/or a distance between the hole 708c and the hole 708d may be 1.6 inches±01 inches. A distance between the hole 708a and the hole 708c and/or a distance between the hole 708b and the hole 708d may be 3.3 inches±0.01 inches. The combination of the microstrip antenna 302 and the monopole antenna 304 may advantageously allow the GNSS active antenna 700 to comply with the ARINC 743 footprint while providing null steering functionality, with minimal impact to the height of the GNSS active antenna 700. For example, the GNSS active antenna 700 may include a height of 0.35 inches taller than the ARINC 743 standard of 0.75 inches, or a height of 1.10 inches or less. In this regard, the GNSS active antenna 700 may be retrofit to the airborne platform 101 to provide the airborne platform 101 with anti-jam or anti-spoof functionality for GNSS signals.

The connector 706 may include an RF coaxial connector, such as, but not limited to, a Threaded Neill Concelman (TNC) connector and the like. The connector 706 may connect the GNSS active antenna 700 to the GNSS receiver 206. The GNSS receiver 206 may then connect to one or more systems or sub-systems of the aircraft.

Figure 8A:
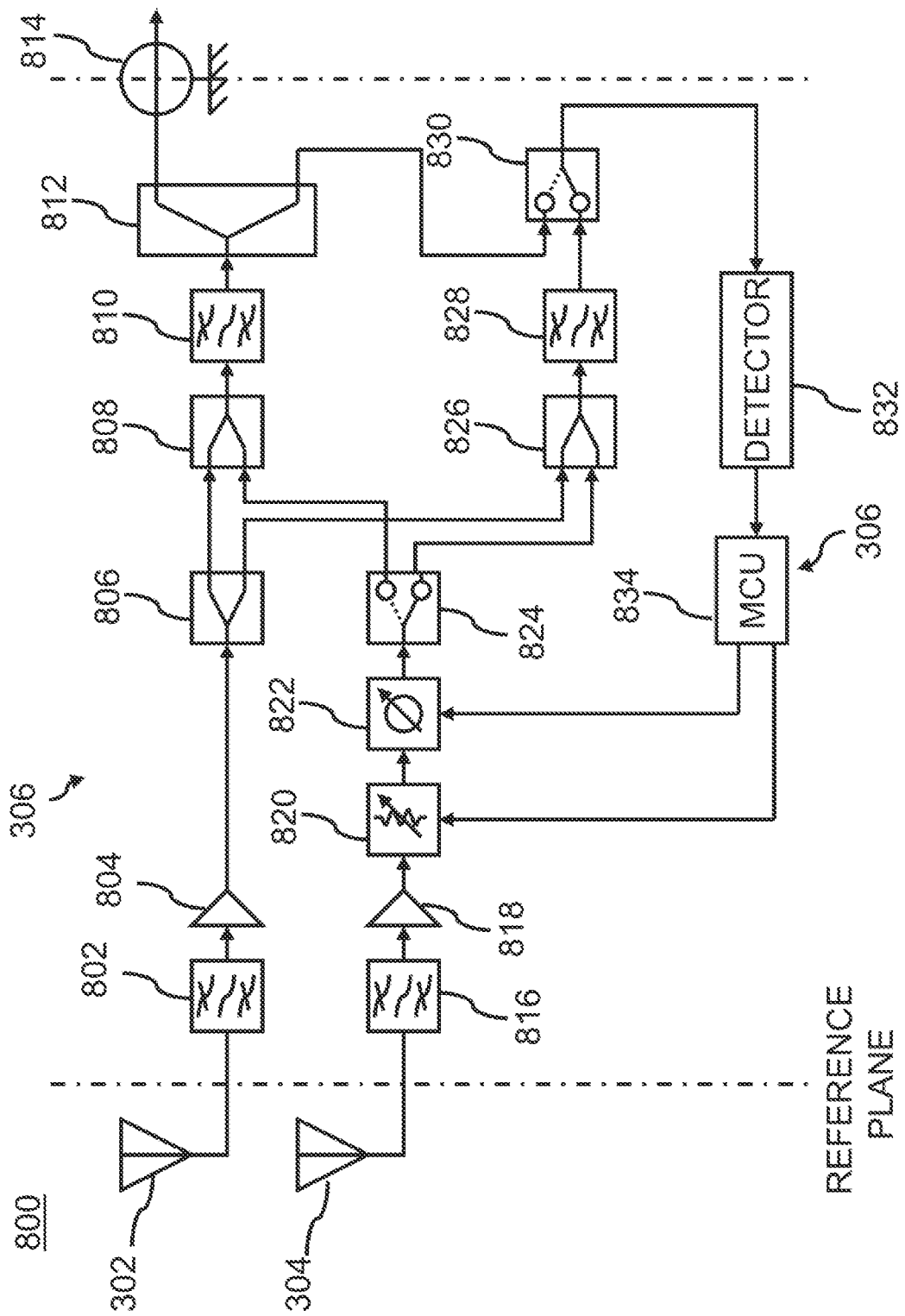
FIGS. 8A-8B depict a block diagram of a GNSS active antenna, in accordance with one or more embodiments of the present disclosure.
Figure 8B:
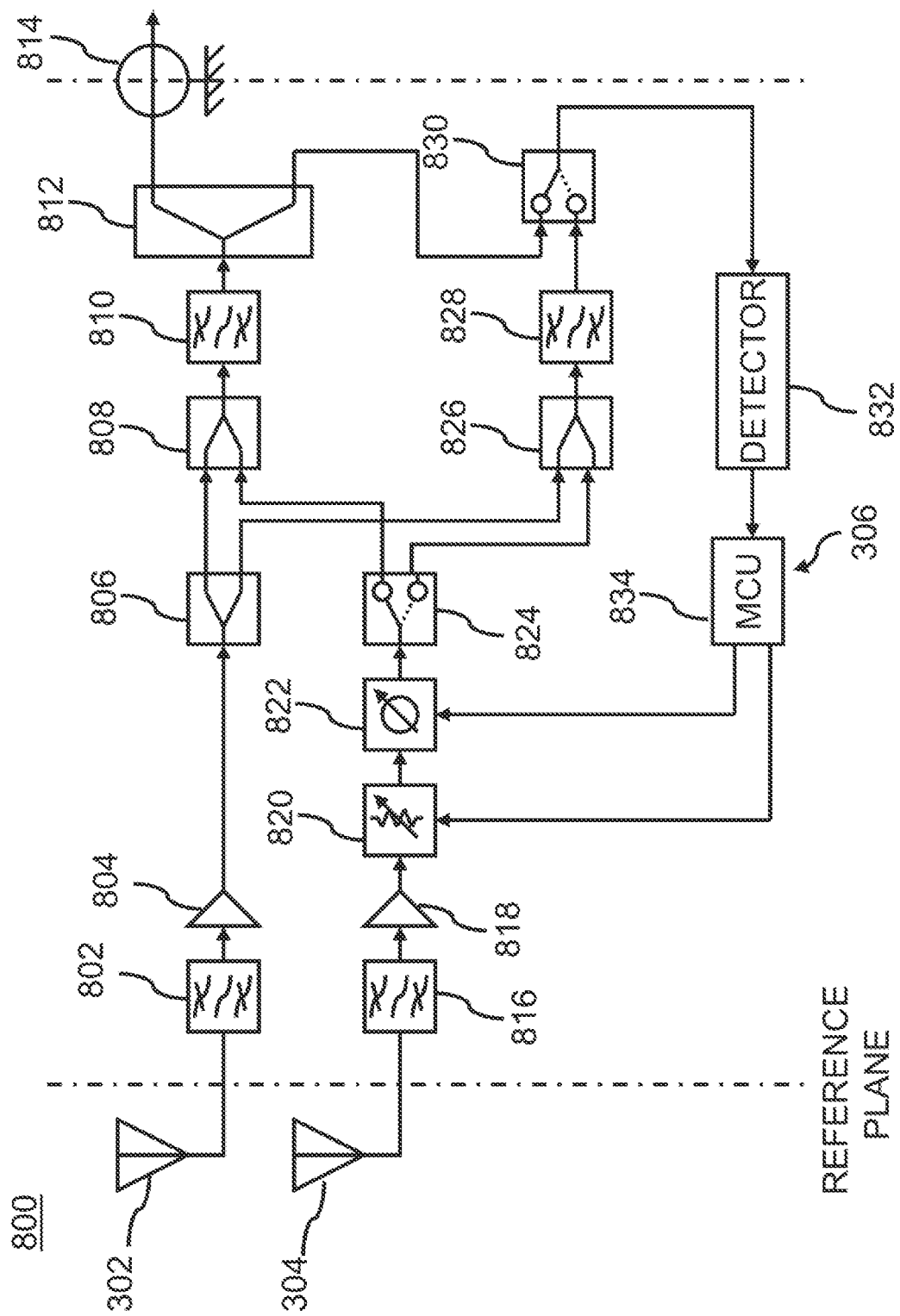

Referring now to FIGS. 8A-8B, a block diagram of a GNSS active antenna 800 is described, in accordance with one or more embodiments of the present disclosure. The GNSS active antenna 800 may be one example of the GNSS active antenna 205 and/or the GNSS active antenna 700. In particular, the GNSS active antenna 800 may provide an example circuit diagram for the active sub-assembly 306. The microstrip antenna 302 may receive one or more electromagnetic waves and convert the electromagnetic waves to an electrical radio frequency (RF) signal. Similarly, the monopole antenna 304 may receive one or more electromagnetic waves and convert the electromagnetic waves to an RF signal. The RF signals from the microstrip antenna 302 and the monopole antenna 304 may then pass through the various component, as will be described.

In embodiments, the active sub-assembly 306 may include one or more of a bandpass filter 802, a low-noise amplifier 804, a power divider 806, a power combiner 808, a bandpass filter 810, a power divider 812, an active antenna output 814 (e.g., connector 706, coaxial cable), a bandpass filter 816, a low-noise amplifier 818, an attenuator 820, a phase shifter 822, a switch 824, a power combiner 826, a bandpass filter 828, a switch 830, a detector 832, a microcontroller 834 (MCU), and the like.

The bandpass filter 802 may also be referred to as a preselector filter. The bandpass filter 802 may include an input port coupled to the microstrip antenna 302 and an output port coupled to the low-noise amplifier 804. The bandpass filter 802 may filter one or more bands from the RF signal received from the microstrip antenna 302.

The low-noise amplifier 804 may include an input port coupled to the bandpass filter 802 and an output port coupled to the power divider 806. The low-noise amplifier 804 may amplify the RF signal received from the bandpass filter 804.

The power divider 806 may include an input port coupled to an output port of the low-noise amplifier 804. The power divider 806 may include a first output port coupled to a first input port of the power combiner 808 and a second output port coupled to a first output port of the power combiner 826. The power divider 806 may divide the RF signal received from the low-noise amplifier 804 between the power combiner 808 and the power combiner 826.

The bandpass filter 816 may also be referred to as a preselector filter. The bandpass filter 816 may include an input port coupled to the monopole antenna 304 and an output port coupled to the low-noise amplifier 818. The bandpass filter 816 may filter one or more bands from the RF signal received from the monopole antenna 304.

The low-noise amplifier 818 may include an input port coupled to the bandpass filter 816 and an output port coupled to the attenuator 820. The low-noise amplifier 818 may amplify the RF signal received from the bandpass filter 816.

The attenuator 820 may include an input port coupled to the low-noise amplifier 818 and an output port coupled to the phase shifter 822. In embodiments, the attenuator 820 may be a variable attenuator. The attenuator 820 may attenuate the RF signal received from the low-noise amplifier 818 based on a feedback signal from the microcontroller 834. In particular, the GNSS active antenna 800 may use the attenuator 820 to attenuate RF signals received at a low-elevation angle (e.g., interfering signals). The attenuator 820 may reduce the gain of the RF signals from the monopole antenna 304 to a given gain (dB). The RF signals may be attenuated to a level which provides destructive interference with the RF signals output by the low-noise amplifier 804 and/or power divider 806 (e.g., RF signals received by the microstrip antenna 302).

The phase shifter 822 may include an input port coupled to the attenuator 820 and an output port coupled to the switch 824. In embodiments, the phase shifter 822 may be a variable phase shifter. The phase shifter 822 may shift a phase of the RF signal received from the attenuator 820 based on a feedback signal from the microcontroller 834. In particular, the GNSS active antenna 800 may use the phase shifter 822 to shift a phase of RF signals received at a low-elevation angle (e.g., interfering signals). The RF signals may be phase shifted to provide destructive interference with the RF signals output by the low-noise amplifier 804 and/or power divider 806 (e.g., RF signals received by the microstrip antenna 302).

Although the phase shifter 822 is described and depicted as being coupled to the output port of the attenuator 820, this is not intended as a limitation of the present disclosure. It is contemplated that the order of the attenuator 820 and the phase shifter 822 may be reversed. For example, the output port of the low-noise amplifier 818 may be coupled to the input port of the phase shifter 822. The output port of the phase shifter 822 may then be coupled to the attenuator 820. In general, the attenuator 820 and the phase shifter 822 may be coupled between the low-noise amplifier 818 and the switch 824.

The switch 824 may enable the null steering and/or control the scan mode 320 and cancellation mode 322. The switch 824 may switch between the standard DO-301 antenna characteristics and the controlled radiation pattern array (CRPA). The switch 824 may include an input port coupled to the phase shifter 822 and/or the attenuator 820. The switch 824 may include a first output port coupled to a second input port of the power combiner 808. The switch 824 may include a second output port coupled to a second input port of the power combiner 826. The switch 824 may switch the RF signal received from the phase shifter 822 and/or the attenuator 820 between the power combiner 808 and the power combiner 826. The RF signal received from the phase shifter 822 and/or the attenuator 820 may be referred to as an attenuated and phase-adjusted output (i.e., having been attenuated and phase-adjusted).

The power combiner 808 may include the first input port coupled to the first input port of the power divider 806 and a second input port coupled to the switch 824. The power combiner 808 may include an output port coupled to an input port of the bandpass filter 810. The power combiner 808 may combine the RF signal received from the power divider 806 with the RF signal received from the switch 824. The combined signal may include destructive interference which has been steered in azimuth towards a signal received at a low-elevation angle. In this regard, the GNSS active antenna 800 may be considered to provide null steering.

The bandpass filter 810 may also be referred to as a post-selector filter. The bandpass filter 810 may include an input port coupled to the output port of the power combiner 808 and an output port coupled to an input port of the power divider 812. The bandpass filter 810 may filter one or more bands from the RF signal received from the power combiner 808.

The power divider 812 may include the input port coupled to the output port of the bandpass filter 810. The power divider 812 may include a first output port coupled to the active antenna output 814 and a second output port coupled to a first input port of the switch 830. The power divider 812 may divide the power of the RF signal received from the bandpass filter 810.

The active antenna output 814 may be coupled to the first output port of the power divider 812. The active antenna output 814 may also be coupled to the GNSS receiver 206. The active antenna output 814 may also be referred to as the connector 706, a coaxial cable, and/or an output path of the GNSS active antenna.

The power combiner 826 may include a first input port connected to the second output port of the power divider 806. The power combiner 826 may include a second output port connected to the second output port of the switch 824. The power combiner 826 may include an output port coupled to an input port of the bandpass filter 828. The power combiner 808 may combine the RF signal received from the power divider 806 with the RF signal received from the switch 824. The combined signal may include destructive interference which has been steered in azimuth towards a signal received at a low-elevation angle.

The bandpass filter 828 may also be referred to as a post-selector filter. The bandpass filter 828 may include an input port coupled to the output port of the power combiner 826 and an output port coupled to a second input port of the switch 830. The bandpass filter 828 may filter one or more bands from the RF signal received from the power combiner 808.

The switch 830 may select which signal is measured by the detector 832. In the scan mode 320, the switch 830 switches the detector 832 to measure the output through the bandpass filter 828. In the cancellation mode 322, the switch 830 switches the detector 832 to measure the output through the power divider 812. The switch 830 may include a first input port coupled to the power divider 812. The switch 830 may include a second input port coupled to the output port of the bandpass filter 828. The switch 824 may include an output port coupled to the detector 832. The switch 824 may switch between receiving an RF signal from the power divider 812 and the bandpass filter 828.

The detector 832 may include an input port coupled to the output port of the switch 830. The detector 832 may be an RF detector integrated circuit, although this is not intended as a limitation of the present disclosure. The detector 832 may include an RF power detector. The detector 832 may output a measurement. The measurement may indicate a power of the RF signal received by the detector 832. The power of the RF signal received by the detector 832 may change when the active sub-assembly nulls RF signal in the direction of the interference source 120. The detector 832 may then output the measurement to the microcontroller 834. For example, the detector 832 may output the measurement as a voltage to the microcontroller 834. In embodiments, the detector may include a down converter.

The microcontroller 834 may receive the measurement from the detector 832. The microcontroller 834 may then control the attenuator 820 and the phase shifter 822 based on the measurement. The microcontroller 834 may provide one or more outputs to the attenuator 820 and/or the phase shifter 822, such as a voltage output. The attenuator 820 may change an attenuation in response to the output. The phase shifter 822 may shift a phase in response to the output.

The bandpass filter 802, bandpass filter 810, bandpass filter 816, and/or bandpass filter 828 may include a passband. Frequencies within the passband may not experience significant attenuation from the filter. For example, the filter may cause electromagnetic waves to include a gain of at or near zero within the passband. The passband may also include the center wavelength λ and/or a center frequency. The center frequency may be disposed between upper and lower cutoff frequencies for the passband (e.g., an arithmetic mean and/or geometric mean of the cutoff frequency). The bandpass filter may also include a stopband. The stopband may be provided on each side of the passband. Frequencies/wavelengths within the stopband may experience significantly more attenuation than frequencies/wavelengths within the passband. The filter may thus be used to filter the bands of electromagnetic waves by the stopband and the passband. In embodiments, the filter may be centered on GPS L1, GPS L2, and/or GPS L5, although this is not intended as a limitation of the present disclosure.

The low-noise amplifier 804 and/or the low-noise amplifier 818 may be configured to receive RF signal and amplify the RF signals. The amplifiers may include a noise figure.

The power divider 806 and/or the power divider 812 may be configured to receive RF signals and divide the signal into two output ports. The power combiner 808 and the power combiner 826 may be configured to receive two RF signals and combine the signals into one output signal at an output port. The dividers and combiners may also be referred to as power splitters. Power splitters may be referred to as dividers or combiners depending upon the direction of input ports and output ports.

The attenuator 820 may include any RF attenuator, such as, but not limited to, a digital step attenuator and the like.

The phase shifter 822 may include any RF adjuster, such as, but not limited to, a digital phase shifter (DPS).

Although the GNSS active antenna 800 is described as including the attenuator 820 and the phase shifter 822, this is not intended as a limitation of the present disclosure. In embodiments, the GNSS active antenna 800 may include a quadrature modulator (not depicted). The quadrature modulator may be disposed between the low-noise amplifier 818 and the switch 824. The quadrature modulator may perform a function similar to the attenuator 820 and the phase shifter 822. For example, the quadrature modulator may adjust a phase and an amplitude of the RF signal received from the monopole antenna 304 for steering the null. The quadrature modulator may provide adjustments to the amplitude and phase by adjusting the in-phase (I) and quadrature (Q) terms of the RF signal. The microcontroller may cause the quadrature modulator to attenuate and adjust a phase of the RF signals.

Referring now in particular to FIG. 8A. In embodiments, the GNSS active antenna 800 may be in the scan mode 320. The GNSS active antenna may disconnect the monopole antenna 304 from the output path (e.g., the active antenna output 814) in the scan mode 320. The GNSS active antenna 800 may disconnect the monopole antenna 304 from the output path by the active sub-assembly 306. For example, the active sub-assembly 306 may include the switch 824 and the switch 830. The active sub-assembly 306 may cause the switch 824 and the switch 830 to each switch to the position depicted. As depicted, the switch 824 is switched to the second output port and coupled to the power combiner 826. The switch 824 switches the RF signal from the monopole antenna 304 to the detector 832 and the microcontroller 834. The switch 824 prevents the output from the monopole antenna 304 from being combined with the output from the microstrip antenna 302 at the combiner 808. Instead, the output from the monopole antenna 304 is combined with the output from the microstrip antenna 302 at the combiner 826. The combined output then passes through the bandpass filter 828 to the switch 830. As depicted, the switch 830 is coupled to the bandpass filter 828 and switched to the second input port. The detector 832 then receives the combined output.

In embodiments, the RF signal from the microstrip antenna 302 may follow two paths while the monopole antenna 304 is disconnected from the output path. The RF signal may flow from the microstrip antenna 302, through the bandpass filter 802 and the low-noise amplifier 804 to the power divider 806. The RF signal from the microstrip antenna 302 may be split at the power divider into a first path and a second path. The RF signal in the first path may flow through the power combiner 808, the bandpass filter 810, and the power divider 812 to the active antenna output 814. The RF signal in the first path may be considered MOPS compliant, as the RF signal is not combined with the RF signal from the monopole antenna 304 (e.g., FIG. 5A). The RF signal in the second path may be combined with the RF signal from the monopole antenna 304 at the power combiner 826. The RF signal in the second path may then flow through the bandpass filter 828 and the switch 830 to the detector 832. The detector 832 may then perform null steering on the second path to detect the interferer. The detector 832 may detect the interferer without impacting the RF signal in the first path and/or output by the active antenna output 814. Thus, the output RF signal in the first path looks like a MOPS compliant antenna. The RF signal in the second path may exhibit a non-omnidirectional radiation pattern (e.g., FIG. 5B) due to the null steering.

Referring now in particular to FIG. 8B. The GNSS active antenna 800 may be in the cancellation mode 322. The GNSS active antenna 800 may connect the monopole antenna 304 with an output path (e.g., the active antenna output 814) in the cancellation mode 322. The GNSS active antenna 800 may connect the monopole antenna 304 with the output path by the active sub-assembly 306. For example, the active sub-assembly 306 may include the switch 824 and the switch 830. The active sub-assembly 306 may cause the switch 824 and the switch 830 to each switch to the position depicted. As depicted, the switch 824 is switched to the first output port and coupled to the power combiner 808. The switch 824 switches the RF signal from the monopole antenna 304 to be combined with the RF signal from the microstrip antenna 302. The power combiner 808 then combines the RF signal from the monopole antenna 304 to be combined with the RF signal from the microstrip antenna 302. The combined RF signal is then bandpass filtered by the bandpass filter 810 and divided at the power divider 812. The combined RF signal may exhibit a non-omnidirectional radiation pattern (e.g., FIG. 5B) due to the null steering. The combined RF signal may then be output by the active antenna output 814. The combined RF signal may also be provided to the switch 830. As depicted, the switch 830 is switched to the first input port and coupled to the power divider 812. The detector 832 then receives the combined RF signal from the power divider 812 by way of the switch 830.

Referring now to FIG. 9, a flow diagram of a method 900 is described, in accordance with one or more embodiments of the present disclosure. The method 900 may be implemented by one or more components of the active sub-assembly 306, such as, but not limited to, the microcontroller 834.

In a step 902, a null (e.g., null 510) at a low-elevation angle is scanned across azimuth and a signal is measured. Scanning may refer to revolving a null across the full range of angles in azimuth. The null at the low-elevation angle may be scanned across azimuth by controlling a phase and an attenuation of a signal received from the monopole antenna 304 before combining with the signal received from the microstrip antenna 302. The signal strength may refer to a receiver signal level (dBm). Scanning may refer to motion of a null in azimuth (e.g., motion between 0 and 360 degrees in azimuth). The null may be scanned with the monopole antenna disconnected from the output path when the active sub-assembly is in the scan mode.

In a step 904, a signal level drop-off is detected at an angle in azimuth. The signal level drop-off corresponds to an interference source at a low-elevation angle. The drop off in the signal level may imply that there is a GNSS signal is coming from a single azimuth direction at a low-level elevation (as opposed to half a dozen different satellites spaced all above the GNSS active antenna). The signal level drop-off may include a change in receiver signal level of 10 dBm or more. The step 904 may be considered performing angle-of-arrival (AOA) measurements on an interfering signal. The signal level drop-off may be detected with the monopole antenna disconnected from the output path when the active sub-assembly is in the scan mode.

In a step 906, the null at the low-elevation angle is directed at the angle in azimuth which includes the signal level drop-off. The signal received from the interfering source may then be nulled. Thus, the controlled radiation pattern including the null directed at the angle in azimuth may be generated. The interference source may be monitored and the null may be directed towards the interference for as long as the interference persists.

Figure 10A:
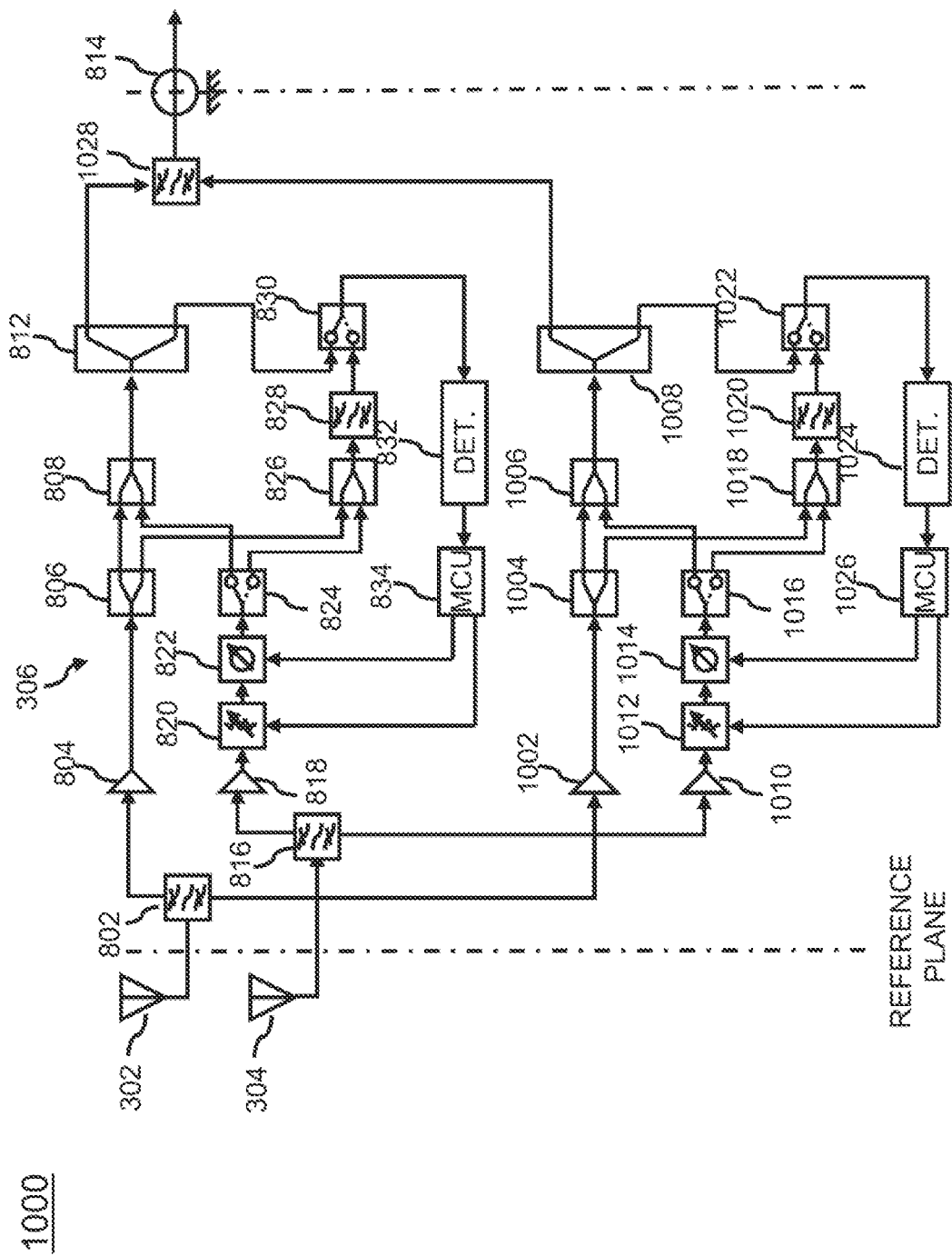
FIGS. 10A-10B depict a block diagram of a multi-frequency GNSS active antenna, in accordance with one or more embodiments of the present disclosure.
Figure 10B:
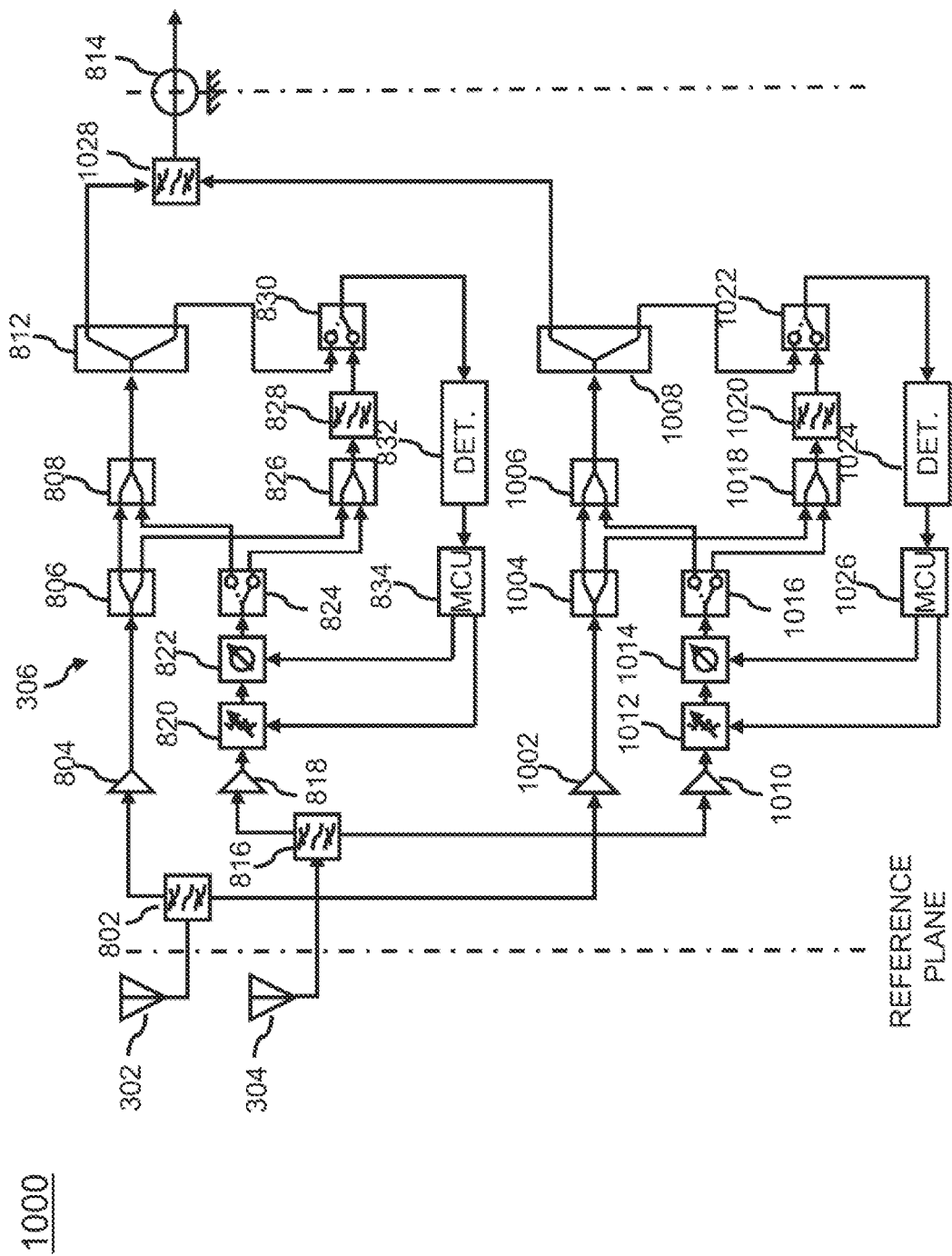

Referring now to FIG. 10A-10B, a block diagram of a GNSS active antenna 1000 is described, in accordance with one or more embodiments of the present disclosure. The GNSS active antenna 1000 may be one example of the GNSS active antenna 205 and/or the GNSS active antenna 700. In particular, the GNSS active antenna 1000 may provide an example circuit diagram for the active sub-assembly 306 which is configured to receive two GPS frequencies. For example, the GNSS active antenna 1000 may be configured to receive the GPS L1 signal and the GPS L5 signal from the stacked microstrip antenna 412. The GNSS active antenna 1000 may be RTCA DO-373 compliant when the monopole antenna is not coupled to the output path.

The discussion of the GNSS active antenna 800 is incorporated herein by reference to the GNSS active antenna 800. The GNSS active antenna 1000 may be similar to the GNSS active antenna 800, with the exception that the active sub-assembly 306 of the GNSS active antenna 800 is configured to support one signal (e.g., GPS L1 signal) and the active sub-assembly 306 of the GNSS active antenna 1000 is configured to support two signals (e.g., GPS L1 signal and GPS L5 signal).

The GNSS active antenna 1000 may include the bandpass filter 802, low-noise amplifier 804, power divider 806, power combiner 808, power divider 812, active antenna output 814, bandpass filter 816, low-noise amplifier 818, attenuator 820, phase shifter 822, switch 824, power combiner 826, bandpass filter 828, switch 830, detector 832, microcontroller 834 (MCU), and the like. The low-noise amplifier 804, power divider 806, power combiner 808, power divider 812, bandpass filter 816, low-noise amplifier 818, attenuator 820, phase shifter 822, switch 824, power combiner 826, bandpass filter 828, switch 830, detector 832, and microcontroller 834 (MCU) may support a first signal (e.g., GPS L1 signal).

The GNSS active antenna 1000 may also include a low-noise amplifier 1002, a power divider 1004, a power combiner 1006, a power divider 1008, a low-noise amplifier

1010, an attenuator 1012, a phase shifter 1014, a switch 1016, a power combiner 1018, a bandpass filter 1020, a switch 1022, a detector 1024, and a microcontroller 1026. The low-noise amplifier 1002, power divider 1004, power combiner 1006, power divider 1008, low-noise amplifier 1010, attenuator 1012, phase shifter 1014, switch 1016, power combiner 1018, bandpass filter 1020, switch 1022, detector 1024, microcontroller 1026 may support a second signal (e.g., GPS L5 signal).

The low-noise amplifier 1002, power divider 1004, power combiner 1006, power divider 1008, low-noise amplifier 1010, attenuator 1012, phase shifter 1014, switch 1016, power combiner 1018, bandpass filter 1020, switch 1022, detector 1024, and microcontroller 1026 may be similar to the low-noise amplifier 804, power divider 806, power combiner 808, power divider 812, low-noise amplifier 818, attenuator 820, phase shifter 822, switch 824, power combiner 826, bandpass filter 828, switch 830, detector 832, and microcontroller 834 respectively.

The bandpass filter 802 may include the input port coupled to the microstrip antenna 302, a first output port coupled to the low-noise amplifier 804, and a second output port coupled to the low-noise amplifier 1002.

The bandpass filter 816 may include the input port coupled to the monopole antenna 304, a first output port coupled to the low-noise amplifier 818, and a second output port coupled to the low-noise amplifier 1010.

The GNSS active antenna 1000 may also include a bandpass filter 1028. The bandpass filter 1028 may include a first input port coupled to an output port of the power divider 812 and a second input port coupled an output port of the power divider 1008. The bandpass filter 1028 may also include an output port coupled to the active antenna output 814.

The GNSS active antenna 1000 may support both the scan mode 320 and the cancellation mode 322 for both of the signals (e.g., GPS L1 signal and GPS L5 signal). As depicted in FIG. 10A, the GNSS active antenna 1000 may be in the scan mode 320. As depicted in FIG. 10B, the GNSS active antenna 1000 may be in the cancellation mode 322.

Referring generally again to FIGS. 1-10B. Although much of the present disclosure is described in the context of GNSS active antennas and GNSS receivers, this is not intended as a limitation of the present disclosure. It is contemplated that the GNSS active antenna 205 may be modified to receive any circular polarized signal. The active antenna may include a microstrip antenna configured to receive circular polarized signals from a satellite. The GNSS receiver 206 may be modified to be a satellite communication (SATCOM) receiver. The satellite may be part of any satellite network, such as, but not limited to, Iridium™ satellites, Inmarsat™ satellites, and the like. The circular polarized signals may be configured according to a protocol defined by the satellite network. The active antenna may also include a monopole antenna which is concentric to the microstrip antenna. The active antenna may use the monopole antenna in combination with an active sub-assembly to detect interfering signals which interfere with the circular polarized signals from the satellite network and direct a null in azimuth towards the interfering signals.

The methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A GNSS active antenna comprising:
a microstrip antenna comprising a patch disposed on a dielectric substrate, wherein the microstrip antenna defines a hole at a center of the patch, wherein the microstrip antenna is right-hand circular polarized, wherein the microstrip antenna is configured to receive a GNSS signal, wherein the patch is quad probe fed;
a monopole antenna, wherein the monopole antenna is disposed in the hole and concentric with the patch, wherein the monopole antenna and the patch have a common ground plane, wherein the monopole antenna is vertical polarized;
an active sub-assembly coupled to the microstrip antenna and the monopole antenna, wherein the active sub-assembly is configured to generate a controlled radiation pattern comprising a null by combining an output from the microstrip antenna with an output from the monopole antenna, wherein the active sub-assembly is configured to steer the null in azimuth;
wherein the active sub-assembly comprises a scan mode and a cancellation mode; wherein the active sub-assembly is configured to generate an omnidirectional upper hemispheric radiation pattern in the scan mode; wherein the active sub-assembly is configured to generate the controlled radiation pattern comprising the null in the cancellation mode.

2. The GNSS active antenna of claim 1, wherein the monopole antenna is a disk-loaded monopole antenna comprising a simple monopole and a disk coupled to the simple monopole; wherein the disk is parallel to the patch.

3. The GNSS active antenna of claim 2, comprising a radome and a plate; wherein the microstrip antenna, the monopole antenna, and the active sub-assembly are enclosed by the radome and the plate.

4. The GNSS active antenna of claim 1, wherein the GNSS signal comprises a GPS signal, wherein the GPS signal comprises at least a GPS L1 signal.

5. The GNSS active antenna of claim 4, wherein the GPS signal comprises the GPS L1 signal and a GPS L5 signal.

6. The GNSS active antenna of claim 5, wherein the microstrip antenna is a stacked microstrip antenna; wherein the patch is a first patch; wherein the stacked microstrip antenna comprises the first patch and a second patch; wherein the second patch is parallel to the first patch and disposed within the dielectric substrate.

7. The GNSS active antenna of claim 1, wherein the patch is a square patch comprising truncated corners.

8. The GNSS active antenna of claim 1, wherein the active sub-assembly is configured to steer the null in azimuth at or below an elevation of 15 degrees above horizon.

9. The GNSS active antenna of claim 8, wherein the null comprises an antenna gain of between minus 20.0 dBic and minus 25 dBic at zero degrees elevation.

10. The GNSS active antenna of claim 1, wherein the active sub-assembly is configured to:
scan the null across azimuth and measure a signal level;
detect a signal level drop-off at an angle in azimuth; and
generate the controlled radiation pattern comprising the null directed at the angle in azimuth.

11. The GNSS active antenna of claim 1, wherein the omnidirectional upper hemispheric radiation pattern comprises an antenna gain of at least one of:
greater than or equal to minus 2.0 dBic at 15 degrees elevation above horizon;
greater than or equal to minus 3.0 dBic at 10 degrees elevation above horizon;
greater than or equal to minus 4.5 dBic at five degrees elevation above horizon; or
between minus 7.5 dBic and minus 5.0 dBic at zero degrees elevation.

12. The GNSS active antenna of claim 10, wherein the active sub-assembly is configured to scan the null across azimuth and measure the signal level in the scan mode.

13. The GNSS active antenna of claim 1, wherein the active sub-assembly is configured to steer the null in azimuth by:
adjusting a phase and an attenuation of the output from the monopole antenna to generate an attenuated and phase-adjusted output; and
combining the attenuated and phase-adjusted output with the output from the microstrip antenna, wherein the attenuated and phase-adjusted output destructively interferes with the output from the microstrip antenna at the null.

14. The GNSS active antenna of claim 13, wherein the active sub-assembly comprises a quadrature modulator, a detector, and a microcontroller; wherein the microcontroller is configured to cause the quadrature modulator to attenuate and adjust the phase of the output from the monopole antenna.

15. The GNSS active antenna of claim 13, wherein the active sub-assembly comprises an attenuator, a phase shifter, a detector, and a microcontroller; wherein the microcontroller is configured to cause the attenuator to attenuate and cause the phase shifter to adjust the phase of the output from the monopole antenna.

* * * * *